(12) United States Patent
Williams et al.

(10) Patent No.: US 6,629,708 B2
(45) Date of Patent: *Oct. 7, 2003

(54) FERRULE WITH RELIEF TO REDUCE GALLING

(75) Inventors: Peter C. Williams, Cleveland Heights, OH (US); Howard C. B. Kuhns, Aurora, OH (US)

(73) Assignee: Swagelok Company, Solon, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,549

(22) Filed: Dec. 22, 1999

(65) Prior Publication Data

US 2003/0025331 A1 Feb. 6, 2003

Related U.S. Application Data

(63) Continuation-in-part of application No. 09/054,186, filed on Apr. 2, 1998, now Pat. No. 6,131,963, which is a continuation-in-part of application No. 08/834,255, filed on Apr. 15, 1997, now Pat. No. 5,882,050.

(51) Int. Cl.[7] .................................................. F16L 19/06
(52) U.S. Cl. ..................... 285/382.7; 285/342; 285/348
(58) Field of Search ............................. 285/382.7, 342, 285/343, 334.4, 348, 341

(56) References Cited

U.S. PATENT DOCUMENTS

| 388,522 | A | 8/1888 | Beauchemin |
|---|---|---|---|
| 1,323,705 | A | 12/1919 | Lynch |
| 2,150,042 | A | 3/1939 | Shultz |
| 2,179,127 | A | 11/1939 | Lauer |
| 2,182,811 | A | 12/1939 | Kocher |
| 2,251,717 | A | 8/1941 | Parker |
| 2,330,841 | A | 10/1943 | Parker |
| 2,344,032 | A | 3/1944 | Eden |
| 2,405,822 | A | 8/1946 | Franck |
| 2,463,707 | A | 8/1949 | Matousek |
| 2,579,529 | A | 12/1951 | Woodling |

(List continued on next page.)

FOREIGN PATENT DOCUMENTS

| AU | 110622 | * 5/1940 | ............. 285/382.7 |
|---|---|---|---|
| CH | 598 530 | 4/1978 | |

(List continued on next page.)

Primary Examiner—Eric K. Nicholson
(74) Attorney, Agent, or Firm—Calfee, Halter & Griswold LLP

(57) ABSTRACT

High localized loading, galling, and high torque forces have been generally eliminated or greatly reduced in a two ferrule tube fitting assembly through suitable modification of the rear ferrule so as to redirect the reaction forces acting between the front ferrule and the drive nut. The rear ferrule has a cylindrical interior wall that closely surrounds the tube end and is provided on the interior cylindrical wall with a circumferentially continuous radial recess that is located between the nose and rear wall of the rear ferrule. The rear ferrule also has a radially external wall that is substantially conical and additionally shaped to extend radially outward toward the enlarged diameter portion or flange of the rear ferrule. The rear ferrule further includes a contoured face on the rear driven surface of the ferrule that engages the drive surface of the drive nut.

10 Claims, 22 Drawing Sheets

U.S. PATENT DOCUMENTS

| | | |
|---|---|---|
| 2,641,487 A | 6/1953 | LaMarre |
| 2,687,315 A | 8/1954 | Courtot |
| 2,701,149 A | 2/1955 | Kreidel et al. |
| 2,738,994 A | 3/1956 | Kreidel et al. |
| 2,744,651 A | 5/1956 | Bredtschneider |
| 2,749,152 A | 6/1956 | Courtot |
| 3,103,373 A | 9/1963 | Lennon et al. |
| 3,120,696 A | 2/1964 | Lubkin |
| 3,120,969 A | 2/1964 | Schmohl |
| 3,215,457 A | 11/1965 | Teeters |
| 3,250,550 A | 5/1966 | Lyon |
| 3,275,350 A | 9/1966 | Kody |
| 3,290,069 A | 12/1966 | Davis |
| 3,321,947 A | 5/1967 | Teeters |
| 3,336,058 A | 8/1967 | Franck |
| 3,433,508 A | 3/1969 | Teeters |
| 3,445,128 A | 5/1969 | Teeters |
| 3,484,123 A | 12/1969 | van der Velden |
| 3,695,647 A | 10/1972 | Pugliese |
| 3,707,302 A | 12/1972 | Hiszpanski |
| 3,888,522 A | 6/1975 | Moreiras |
| 4,005,824 A | 2/1977 | Becker et al. |
| 4,037,864 A | 7/1977 | Anderson et al. |
| 4,076,286 A | 2/1978 | Spontelli |
| 4,230,349 A | 10/1980 | Normark |
| 4,235,461 A | 11/1980 | Normark |
| 4,361,283 A | 11/1982 | Hetherington et al. |
| 4,630,851 A | 12/1986 | Ogawa |
| 4,702,420 A | 10/1987 | Rath |
| 4,826,218 A | 5/1989 | Zahuranec |
| 4,915,427 A | 4/1990 | Zahuranec |
| 5,074,599 A | 12/1991 | Wirbel et al. |
| 5,183,322 A | 2/1993 | Haruch |
| 5,217,261 A | 6/1993 | DeWitt et al. |
| 5,351,998 A | 10/1994 | Behrens et al. |
| 5,482,232 A | 1/1996 | Ohmi et al. |
| 5,882,050 A | 3/1999 | Williams et al. |
| 5,934,714 A | 8/1999 | Sugiyama et al. |
| 6,073,976 A * | 6/2000 | Schmidt et al. .......... 285/382.7 |
| 6,131,963 A * | 10/2000 | Williams et al. ......... 285/382.7 |

FOREIGN PATENT DOCUMENTS

| | | | |
|---|---|---|---|
| DE | 1600553 | * 5/1979 | .............. 285/382.7 |
| DE | 40 41 679 A1 | 6/1992 | |
| DE | 4219722 | * 12/1993 | .............. 285/382.7 |
| DE | 4238877 | * 5/1994 | .............. 285/382.7 |
| EP | 0 071 678 | 2/1983 | |
| EP | 0 223 185 A1 | 5/1987 | |
| EP | 0 484 091 A1 | 5/1992 | |
| EP | 0 489 289 A1 | 6/1992 | |
| EP | 0 528 079 A1 | 2/1993 | |
| FR | 757.204 | 12/1933 | |
| FR | 1.092.160 | 4/1955 | |
| FR | 1170298 | * 1/1959 | .............. 285/382.7 |
| GB | 836.002 | 6/1960 | |
| GB | 2 032 555 A | 5/1980 | |
| GB | 2 080 900 A | 2/1982 | |
| JP | 05079586 A | 3/1993 | |
| NL | 6 710 340 | 1/1968 | |
| WO | WO 89/09904 | 10/1989 | |
| WO | WO 93/25837 | 12/1993 | |
| WO | WO 97/07356 | 2/1997 | |
| WO | WO 97/20163 | 6/1997 | |
| WO | WO 98/32999 | 7/1998 | |
| WO | WO 98/46925 | 10/1998 | |

* cited by examiner

| VARIATIONS | TEAR DROP | RIGHT TRIANGLE | RECTANGLE | OVAL | SQUARE | CIRCULAR | OBTUSE TRIANGLE | CURVE | COMPOUND CURVE |
|---|---|---|---|---|---|---|---|---|---|
| STANDARD LOCATION | | | | | | | | | |
| FORWARD LOCATION | | | | | | | | | |
| REARWARD LOCATION | | | | | | | | | |
| REVERSE DIRECTION | | | | X | | X | | | X |
| MULTIPLE SHAPES | | | | X | X | X | | | X |
| REVERSE MULTIPLE SHAPES | | | | X | X | X | | | X |
| ENLARGED SINGLE SHAPE | | | | | | | | | |
| ENLARGED MULTIPLE SHAPES | | | | | | | | | X |

FIG. 14

FERRULE WITH RELIEF TO REDUCE GALLING

CROSS-REFERENCE TO RELATED APPLICATION

This application is a continuation-in-part of U.S. patent application Ser. No. 09/054,186 filed on Apr. 2, 1998 now U.S. Pat. No. 6,131,963, which is a continuation-in-part of U.S. patent application Ser. No. 08/834,255 filed on Apr. 15, 1997, now U.S. Pat. No. 5,882,050, the entire disclosures of which are fully incorporated herein by reference.

BACKGROUND OF THE INVENTION

The subject invention is directed to the art of ferrule type tube fittings. More particularly, the invention concerns a two ferrule fitting wherein the rear ferrule is designed to reduce the torque required to rotate the associated nut and to also reduce galling between the rear ferrule and the interior surface of the drive nut. The invention may also be applied in a single ferrule fitting.

A commercially available and highly successful two ferrule fitting used for tubing is illustrated in FIGS. 1 and 1A. FIG. 1 shows the fitting components in a finger tight position preparatory to final tightening, whereas FIG. 1A shows the fitting after final tightening. As shown, the fitting comprises a body 10 having a cylindrical opening 12 counterbored for receiving tube end 13. A tapered, frusto-conical camming mouth 14 is located at the axial outer end of the counterbore. A front ferrule 16 having a smooth, cylindrical inner wall 18 is closely received on the tube. The front ferrule has a frusto-conical outer surface 20 to be received in the camming mouth.

Associated with the front ferrule 16 and located axially outward therefrom is a rear ferrule 22 configured as shown with a tapered nose portion 24 and a rear flange 26 having an inclined end surface 28. The inclined end surface of the rear ferrule 22 provides a radial component as well as an axial component of the pull-up forces acting on the end surface as will be apparent to those skilled in the art. The tapered nose 24 enters a tapered camming surface in the rear surface of the front ferrule.

The ferrules 16, 22 are enclosed by a drive nut member 30 threaded to the body 10. During tightening and make-up of the fitting, the inner end face, flange, or shoulder 32 of the nut acts against the rear wall end surface 28 of the rear ferrule to drive the ferrules forwardly into the fully engaged position shown in FIG. 1A.

The small diameter portion or nose of the rear ferrule is dimensioned so that it plastically deforms during make-up of the fitting. This action is desirable since it results in tight gripping engagement of the outer wall of the tubing. The thickness of the nose portion cannot be reduced to an extent that the rear ferrule deforms too much and only the rear ferrule adequately grips the outer wall of the tubing. That is, the two ferrule assembly requires desired deformation of both the front and rear ferrules for the gripping and sealing capabilities that have made this two ferrule assembly a commercially successful product. On the other hand, the thickness of the nose of the rear ferrule cannot be enlarged to such an extent that it results in a structural arrangement that is too stiff and does not permit the desired rear ferrule deformation.

A more complete description and understanding of the conventional two ferrule phase controlled sequential gripping action resulting from the inclined rear surface and the interaction of the front and rear ferrules is set forth in U.S. Pat. No. 3,103,373 issued to Lennon, et al., the entire disclosure of which is fully incorporated herein by reference.

Accordingly, it will be recognized by those skilled in the art that a predetermined wall thickness of the nose of the rear ferrule is desired that achieves the desired gripping of the tube and cooperates with the front ferrule in such a manner that it achieves its desired goals of gripping and sealing the tube.

It is also recognized that operators of fluid systems test the system prior to a production run by pressurizing the system to an appropriate factor times the rated system pressure. In this manner, the operator can easily detect whether the fluid system is sealed, i.e. that there are no leaks. With this knowledge, the manufacturer can provide a fitting in which the nose of the rear ferrule will not have any additional plastic deformation at the elevated test pressure. Accordingly, the elevated test pressure is used to determine the desired wall thickness of the nose portion of the rear ferrule to achieve the desired amount of deformation of the nose and permit the front and rear ferrules to properly grip and seal with the outer wall of the tube.

It has also been found that galling of the drive nut sometimes occurs in the drive face area of engagement between the inner end face of the drive nut and the rear wall of the rear ferrule. After analysis, it is believed that the axial thrust or pull-up force between the front and rear ferrule is essentially parallel to the axis of the fitting. This axial thrust causes the rear corner region of the rear ferrule to selectively concentrate pull-up stress at the inside drive surface of the nut particularly in a localized area to produce the galling. This also noticeably increases the nut torque forces experienced during make-up even if galling is absent. Accordingly, it would be highly desirable to provide a design wherein the thrust forces do not produce the high localized loading with the resultant galling and high torque forces.

SUMMARY OF THE INVENTION

In accordance with one embodiment of the invention, a tube fitting includes a fitting body having a cylindrical bore for receiving a tube end and including a tapered mouth at one end of the bore; a drive member having a threaded engagement with the body and having a ferrule drive surface; a first ferrule having a tapered first end that extends into the tapered mouth of the fitting body and having a second end with a tapered recess that axially extends toward the first end; and a second ferrule having a cylindrical interior wall, a tapered first end that extends into the tapered recess of the first ferrule, and having a contoured face on a second end thereof that engages the drive member ferrule drive surface; the second ferrule interior wall having a circumferential recess located between the first and second ends of the second ferrule; the recess and the contoured face reducing stress concentrations on the drive member drive surface when the fitting is made up.

Another aspect of the invention includes forming the rear ferrule with a cylindrical interior wall that has a first diameter at the forward or nose end of the ferrule and a second diameter at the rear end of the ferrule wherein the second diameter is greater than the first diameter so that, for example, a single tool can be use to form the circumferential recess and the cylindrical wall. Still a further aspect of the invention includes forming a notch on the outside diameter of the ferrule body that joins the second ferrule first and second ends. In another aspect of the invention, a contoured drive surface is provided on the drive member rather than on the rear ferrule second end. The present invention may also be practiced with ferrules that are made of harder base metal than prior ferrules. The invention may also be practiced with ferrules that have been case hardened either entirely or selectively on the ferrule surface. In general, the present invention may be used in single ferrule fittings as well.

These and other aspects and advantages of the present invention will be apparent to those skilled in the art from the following description of the preferred embodiments in view of the accompanying drawings.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein:

FIG. 14 is a table of different geometrical variations of the rear ferrule configuration;

DETAILED DESCRIPTION OF PREFERRED EMBODIMENTS

Figure 1:
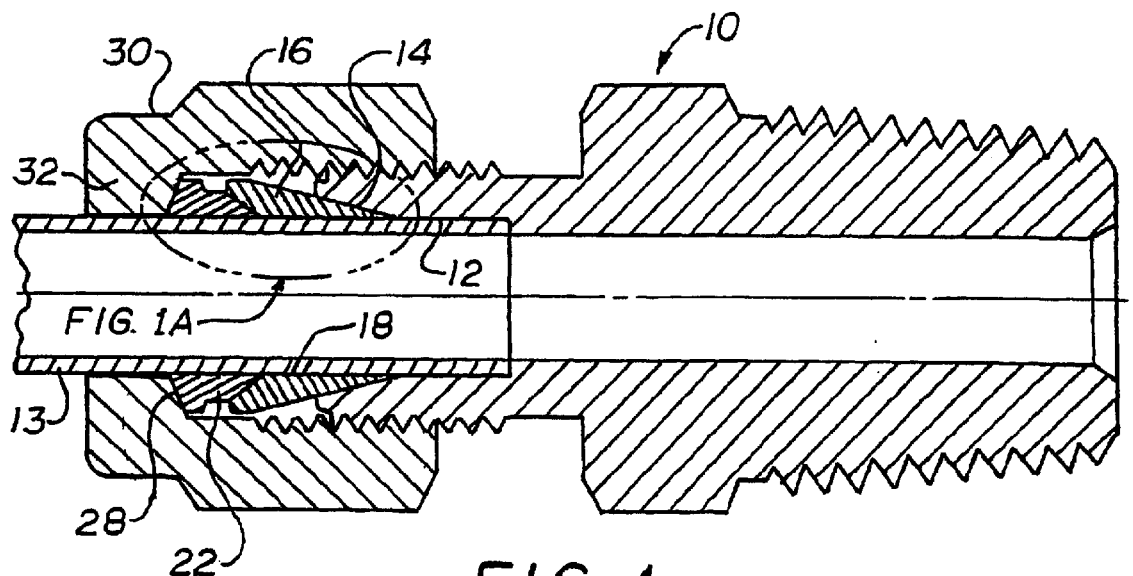
FIG. 1 is a longitudinal cross-sectional view of a well known prior art two ferrule swage-type fitting.
Figure 1A:
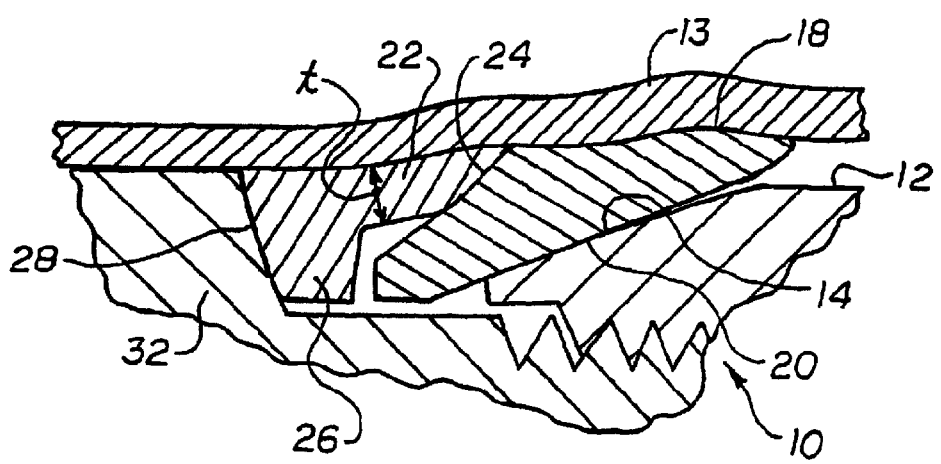
FIG. 1A is an enlarged view of the circled area of FIG. 1 showing the prior art fitting in a made-up condition.
Figure 2:
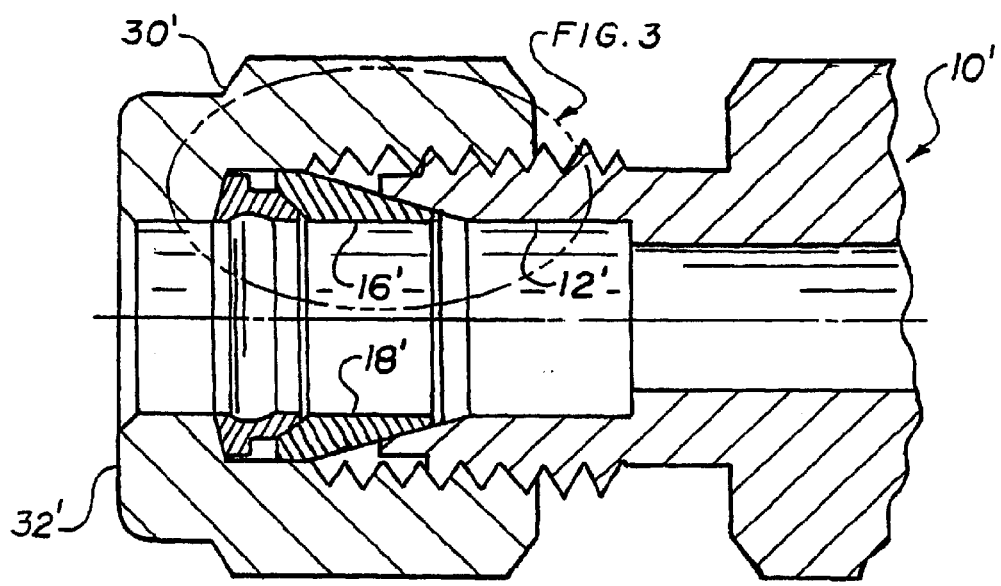
FIG. 2 is a view like FIG. 1 but showing a preferred embodiment of a fitting incorporating a modified rear ferrule designed to improve reaction force transmission through the rear ferrule.
Figure 3:
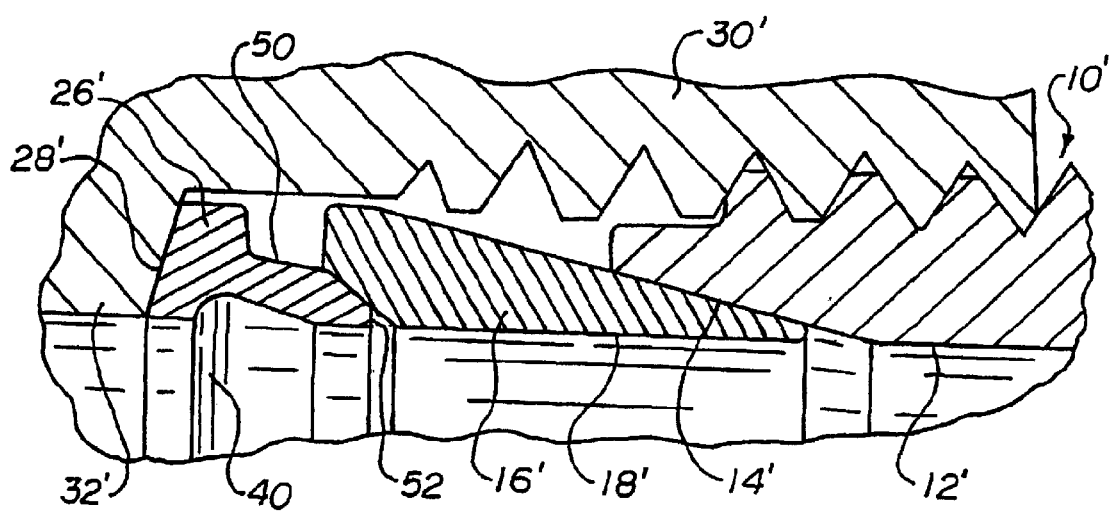
FIG. 3 is a greatly enlarged showing of the circled area of FIG. 2.
Figure 4:
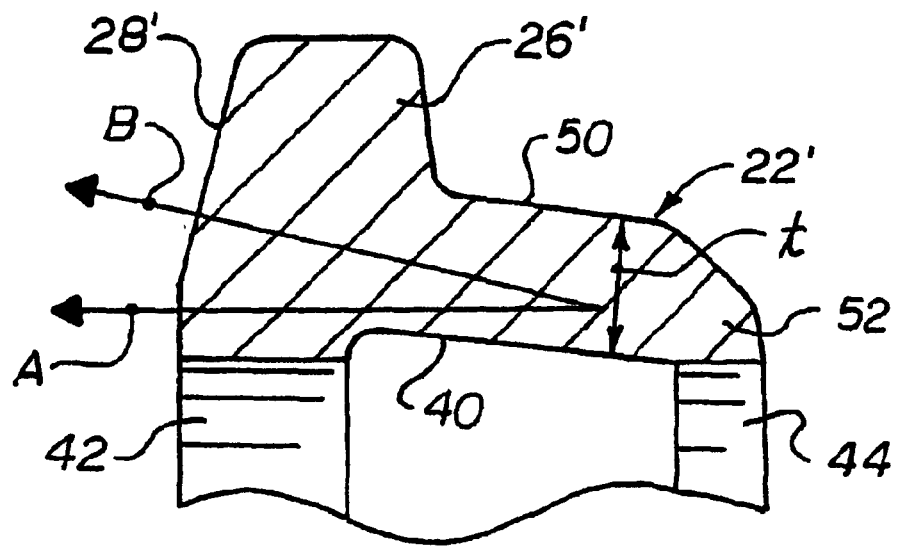
FIG. 4 is a detailed, partial cross-sectional view of a preferred form of rear ferrule.

Referring now to the drawings wherein the showings are for the purposes of illustrating preferred embodiments of the invention only and not for purposes of limiting same, FIGS. 2–4 illustrate the overall arrangement of a fitting incorporating the invention. It should be noted that in many of the illustrations herein of the ferrule profiles, the ferrules are shown in partial cross-section for clarity and ease of understanding, particularly for views of the ferrule geometry and profile wherein it is only necessary to illustrate a portion of the entire ferrule in sectional view. The FIGS. 2–4 embodiment has the major components identified with the same reference numerals used with respect to the description of the prior art device of FIGS. 1 and 1A. A description of a FIG. 1 element is to be taken as equally applicable to the FIGS. 2–4 elements that are correspondingly numbered unless otherwise noted. In particular, in the FIGS. 2–4 embodiment, the rear ferrule 22' has been modified in a manner to cause the reaction forces acting between the front ferrule through the rear ferrule to the nut to have a significant force component that is directed radially outward. This is in contradistinction to the FIGS. 1 and 1A embodiment wherein the force component under consideration has a high axial component. Specifically, as shown in FIG. 4, force component A extends generally axially of the rear ferrule 22' and results in an increase in the loads applied at the radial inner face of the ferrule surface 28' and the flange 32' of the nut. As previously discussed, high localized loading or stress concentration in this area produces high torque and galling.

While the invention is described herein with particular reference to a two ferrule system, such explanation is exemplary in nature and should not be construed in a limiting sense. Various aspects of the present invention may also find application in a single ferrule fitting.

In one embodiment of the invention, a redirection of the reaction forces is achieved by providing a circumferential recess 40 throughout the inner surface of the ferrule 22'. Note that a recess 40 is located generally midway between the opposite ends of the ferrule 22' and this results in the inner surface of the rear ferrule being reduced to two relatively axially narrow substantially cylindrical and continuous contact areas 42 and 44. By so modifying the rear ferrule, the forces which are conducted from the front ferrule through the rear ferrule to the nut surface or flange 32' tend to be directed more radially outward such as diagrammatically illustrated by the force line B of FIG. 4. In this embodiment, the generally flat contact areas 42 and 44 have substantially the same diameter; however in an alternative embodiment, these two regions may have different diameters, for example it may be desirable in some applications to have the diameter of the rear flat area 42 slightly greater than the diameter of the forward flat area 44, for example, by a few thousandths, more preferably one to three thousandths of an inch. In yet a further alternative embodiment, the rear flat area 42 may be eliminated as a contact area by providing a counterbore in this area. Particularly, for larger ferrule sizes, the single flat in the nose section of the rear ferrule may be sufficient to maintain proper ferrule alignment on the tubing during installation. These alternatives will be more fully described hereinafter.

Figure 17:
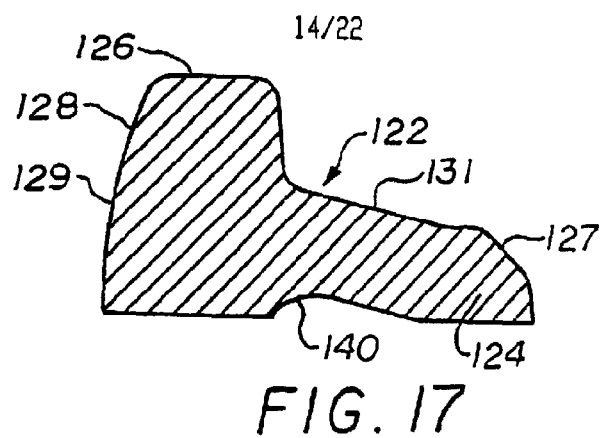
FIG. 17 is a partial view of a rear ferrule with a contoured face in accordance with one aspect of the invention.

Another important feature of the invention is best exemplified by comparing the rear ferrule 22 of FIG. 1 with the rear ferrule 22' of the FIGS. 2–4 embodiment. Particularly, the outer radial wall 50 of the rear ferrule 22' includes a conical section that increases in radial dimension as it extends from the forward nose portion 52, that is received in the rear chamfer region 53 of the front ferrule, to the rear flange 26'. In the prior art arrangement (FIGS. 1 and 1A), the rear ferrule has a cylindrical through bore and an outer radial wall that extends parallel to the inner surface defining the through bore in this region. In other words, the rear ferrule has a constant annular wall thickness "t". In the embodiment of FIGS. 2–4, the outer wall has the conical or tapered configuration that provides sufficient wall thickness "t" and controlled deformation of the nose portion when the recess is incorporated into the modified rear ferrule. Preferably, the outer wall 50 has a generally uniform angle or taper as it extends between the reduced dimension nose region 52 received in the camming mouth of the front ferrule and the enlarged diameter rear flange 26'. Again, this provides controlled deformation of the rear ferrule so that the region 52 is plastically deformed radially inward along surface 44 into gripping, sealed engagement with the outer wall of the tube. Note that in FIG. 4 the recess 40 is so shaped as to appear that the dimension "t" is constant, though it need not be. For example, if the recess 40 is formed such as in many of the illustrations of FIGS. 14, 17 and 18, the tapered outer wall 50 provides a non-uniform thickness "t" between the rear ferrule nose 52 and the rear flange 26'.

The wall thickness "t" and the geometry and configuration of the rear ferrule 22' are selected for a particular application in order to balance and properly align the ferrule 22' on the tubing and to assure that the rear ferrule 22' cooperates with the front ferrule 16' to achieve the desired phase controlled sequential gripping operation during pull-up to assure a proper seal on the tubing. During fitting pull-up, the rear ferrule 22' applies a vector force against the outer surface of the tube end 13 that has both axial and radial components. The radial component force enables an axial friction force on the tube surface to achieve excellent gripping and sealing action. This axial friction force balances against an axial tube grip reaction force from the tube 13.

The combined geometry of the tapered outer wall 50 along with the recess 40 cause a "hinge" effect of the rear ferrule nose portion 52. The selected geometry and configurations will depend on such factors including but not necessarily limited to the materials used for the fitting components, the tube material and wall thickness, the operating pressure for the fitting, whether the rear ferrule is to be case hardened or not, and so forth. In order to maintain proper sequential gripping operation during make-up, it is important that the rear ferrule 22' nose portion 52 does not collapse too soon otherwise the front ferrule 16 may not have sufficient gripping force on the tube wall or an inadequate seal force between the front ferrule 16 and the tapered camming mouth 14. If the rear ferrule 22' collapses too late relative to the front ferrule, then the rear ferrule 22' may not have adequate gripping force on the tube 13 wall.

The rear ferrule 22' hinge effect directs the rear ferrule applied force at the nose section 52 against the tube wall at a significant radial vector angle from the tube surface. This ferrule applied force vector B thus has a significant radial component while enabling the significant axial friction force. Thus, a smaller axial component force applied via the drive member 30 sufficiently opposes the axial tube gripping reaction force in contrast to when the applied force is substantially axial as in the prior art of FIGS. 1 and 1A. The rear ferrule 22' grip of the tube 13 thus approaches a toggle-like hinged action. The smaller axial component force results in reduced nut 30 pull-up torque to achieve the same tube grip.

Figure 28:
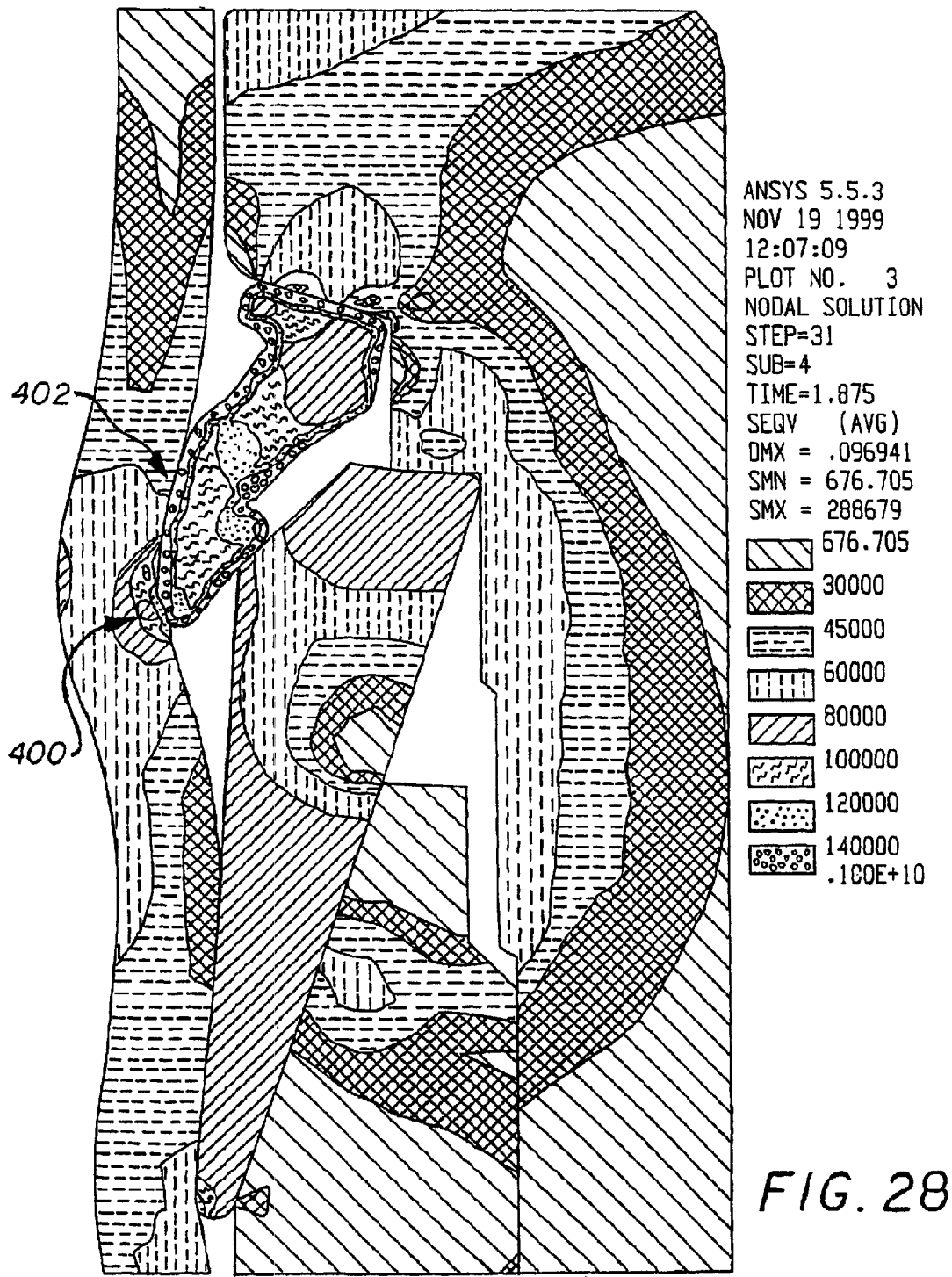
FIG. 28 is a finite element analysis illustrating one aspect of the invention of a high friction tube grip area axially spaced from a stress riser created at the nose of the ferrule.

In addition, during fitting pull-up, this hinge characteristic directs the tube reaction force through the rear ferrule 22' generally toward the central region of the rear ferrule driven surface 28' that contacts the drive surface of the nut shoulder 32'. This results in the reaction forces being more evenly distributed across the rear ferrule 22' driven surface 28' to avoid or reduce high concentrations of stress, thus reducing or eliminating galling and reducing pull-up torque without loss of tube gripping force. In many cases it may be preferred that the reaction forces be directed in a direction generally normal to the rear surface 28' of the rear ferrule. The increased tube gripping force resulting from the applied radial force also imparts greater penetration or swaging of the rear ferrule 22' nose portion onto the tube 13. This provides an excellent tube grip and seal with lower applied torque, and also provides greater resistance to vibration fatigue by providing a swaged region of high gripping pressure behind (i.e. axially rearward) of the tube stress riser created at the forward end of the nose of the rear ferrule 22'. FIG. 28 illustrates this result, in that the stress riser region 400 where the nose penetrates the tube wall 13 is axially forward of a swaged region 402 of high frictional engagement between the ferrule nose and the tube wall. High frictional area or swage produces a collet effect that secures the ferrule on the tube wall and protects the stress riser 400 from vibration. Good gripping action of the rear ferrule forward flat section 44 of the nose portion onto the tube is important for overall performance of the fitting, in contrast to any contact pressure between the rear ferrule rear flat portion 42. In many cases, there is no need for an contact between the portion 42 and the tube 13.

Another benefit resulting from the reduced galling and lower pull-up torque of the present invention is that re-make of the fitting is facilitated. By "re-make" is simply meant that, in some applications, the user desires to separate a tube fitting after installation, possibly to replace a valve, tubing or to perform other routine maintenance and repair, and then to re-install the same fitting without replacing the ferrules and/or nut or body. If the rear ferrule and drive nut have become galled, then the torque required for re-make of the fitting may be prohibitive or impossible, or the fitting may not adequately re-seal. With the use of the present invention to significantly reduce or eliminate galling and reduce pull-up torque, re-make is facilitated.

Although the present invention is useful with many different materials, it has particular advantages when used with stainless steel fittings and tubing, including but not limited to 316 and 316L stainless tubing, but includes in addition to other alloys, Hastalloy, Inconel, Monel alloys 400 and 500, 254SMO and steel, and duplex stainless steel such as, for example, SAF 2507. The present invention can be used with or without case hardening on all or part of the surfaces of the ferrules as required.

With respect to case hardened ferrules or ferrules made of materials substantially harder than 316L stainless steel, the present invention allows the fitting 10 to be properly pulled up with the desired phase controlled sequential gripping of the tube wall. If a conventional ferrule, particularly the rear ferrule, was case hardened or made of a very hard material, the ferrule would be too stiff to achieve proper seal and grip of the tube wall. The present invention however facilitates the use of ferrules of hard materials or that have been case hardened over part or all of their surface. Case hardening herein refers to the treatment of the ferrules in such a manner as to provide a carbon or nitrogen rich surface that substantially hardens the ferrule body as compared to the underlying base metal, as is known to those skilled in the art.

Figure 5:
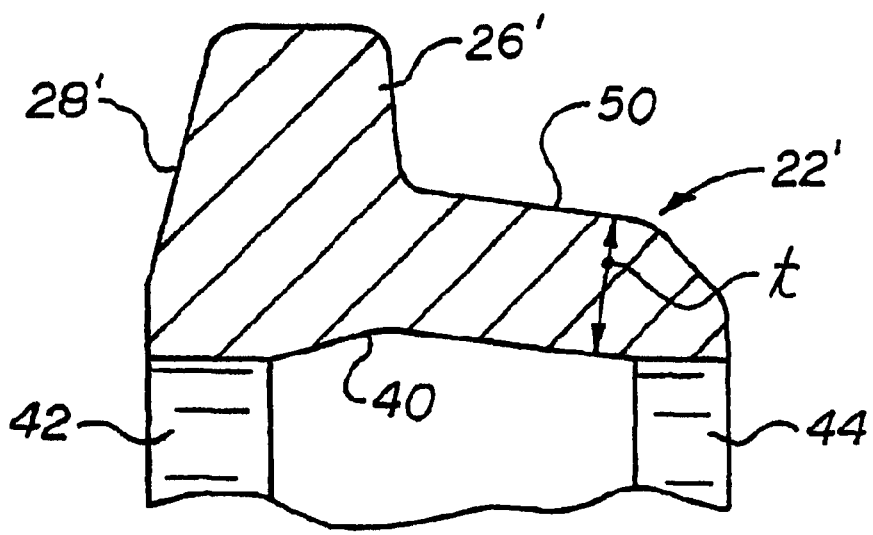
FIG. 5 is a cross-sectional view similar to FIG. 4 showing a second preferred form for the rear ferrule.

FIG. 5 illustrates another preferred embodiment of the rear ferrule in which the recess 40 has is defined by two different angles (an obtuse triangle). For example, the smaller first angle defined with the inner surface increases as it extends rearwardly from the surface 44 toward the rear flange 26'. The larger second angle (approximately twice the angular dimension of the first angle) increases as it extends forwardly from the surface 42 toward the nose region. These angles thus intersect at an axial position that is located beneath the intersection of the outer wall 50 with the rear flange. Accordingly, the stresses are more evenly distributed over the rear face 28'.

Figure 6:
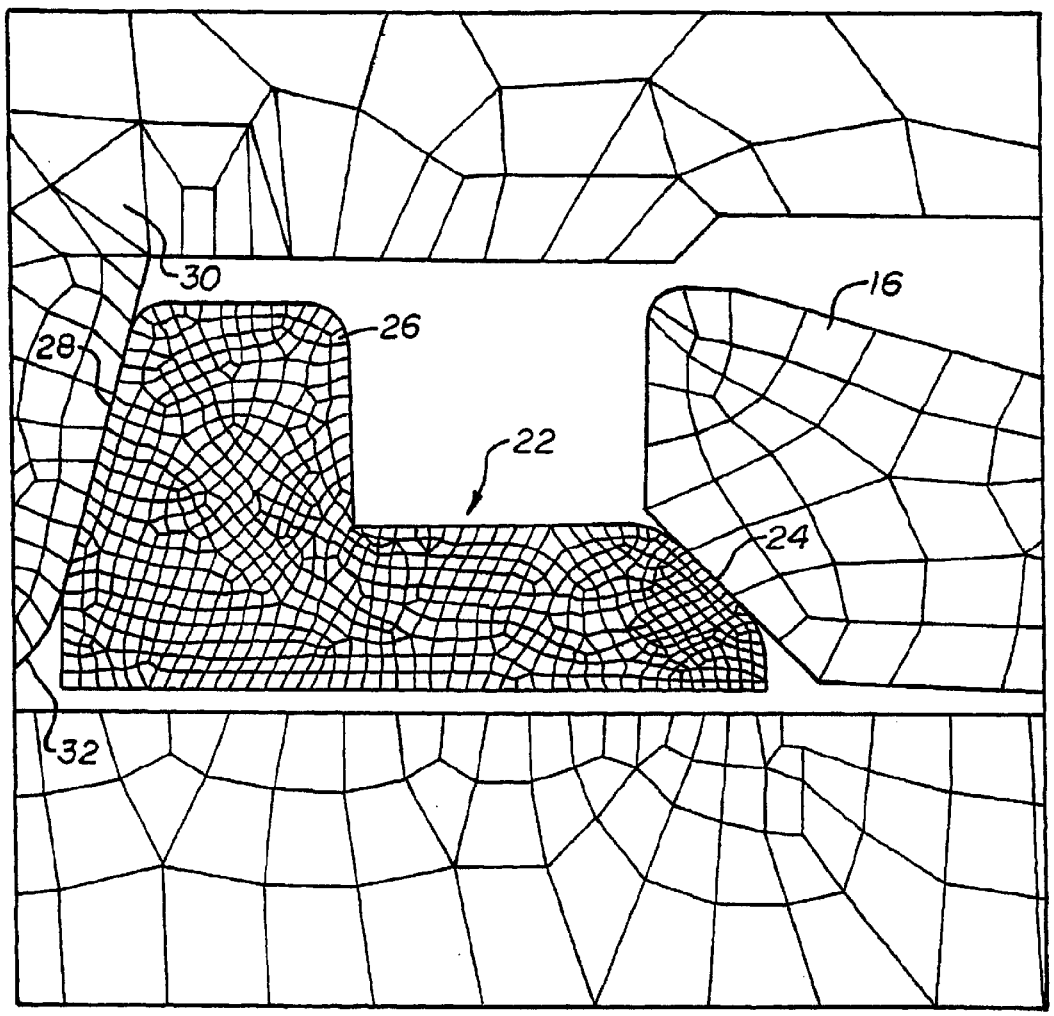
FIG. 6 is a cross-sectional view of the fitting of FIG. 1 particularly showing the rear ferrule positioned between the front ferrule and the nut at initial make-up (graphically meshed for finite element analysis)
Figure 7:
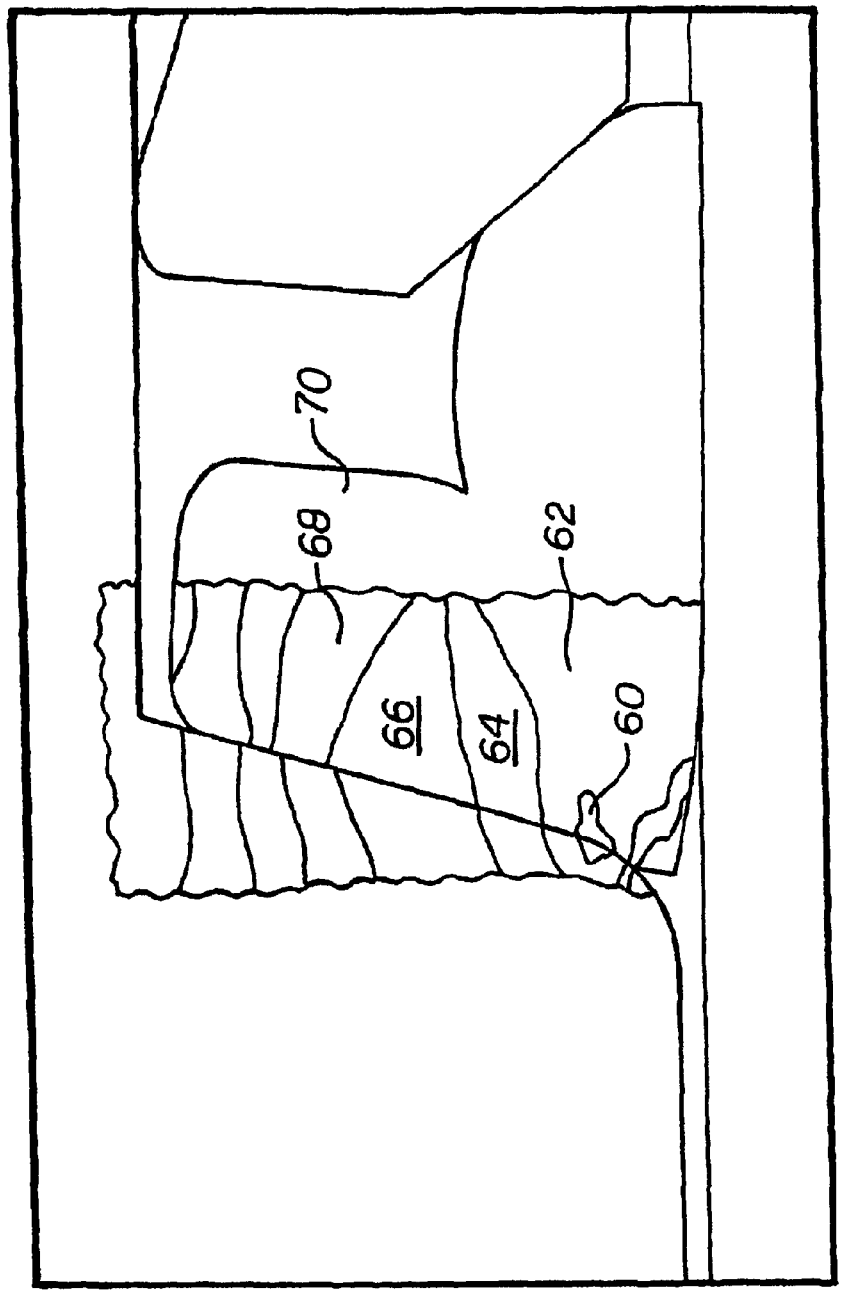
FIG. 7 is a view of the fitting of FIG. 6 in a made-up condition and illustrating the stress concentrations.

Turning to FIGS. 6 and 7, the rear ferrule of the prior art arrangement of FIG. 1 is shown before and after make-up of the fitting. The fitting was subjected to a finite element analysis, the results of which are particularly evident in FIG. 7. There, shaded regions in the rear flange of the rear ferrule and the nut evidence the force and stress concentrations encountered upon make-up of the fitting. Particularly, a region of high stress concentration is designated at area 60. Regions of progressively decreased stress concentration are identified by numerals 62, 64, 66, 68, and 70. Thus, the large stress concentration at the radial inner location of the rear face 28' results in increased torque during make-up and potential galling of the nut.

Figure 8:
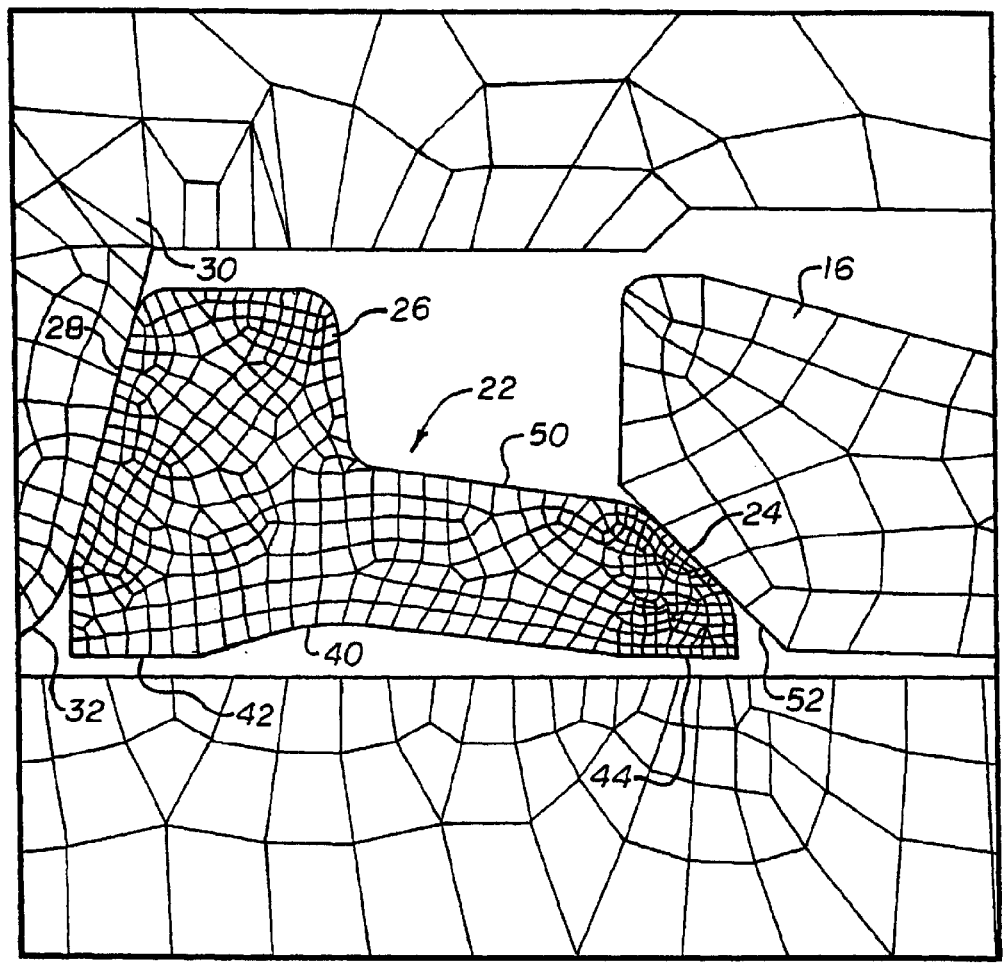
FIG. 8 is a cross-sectional view of a fitting at initial make-up including a rear ferrule modified in accordance with the teachings of the invention (graphically meshed for finite element analysis)
Figure 9:
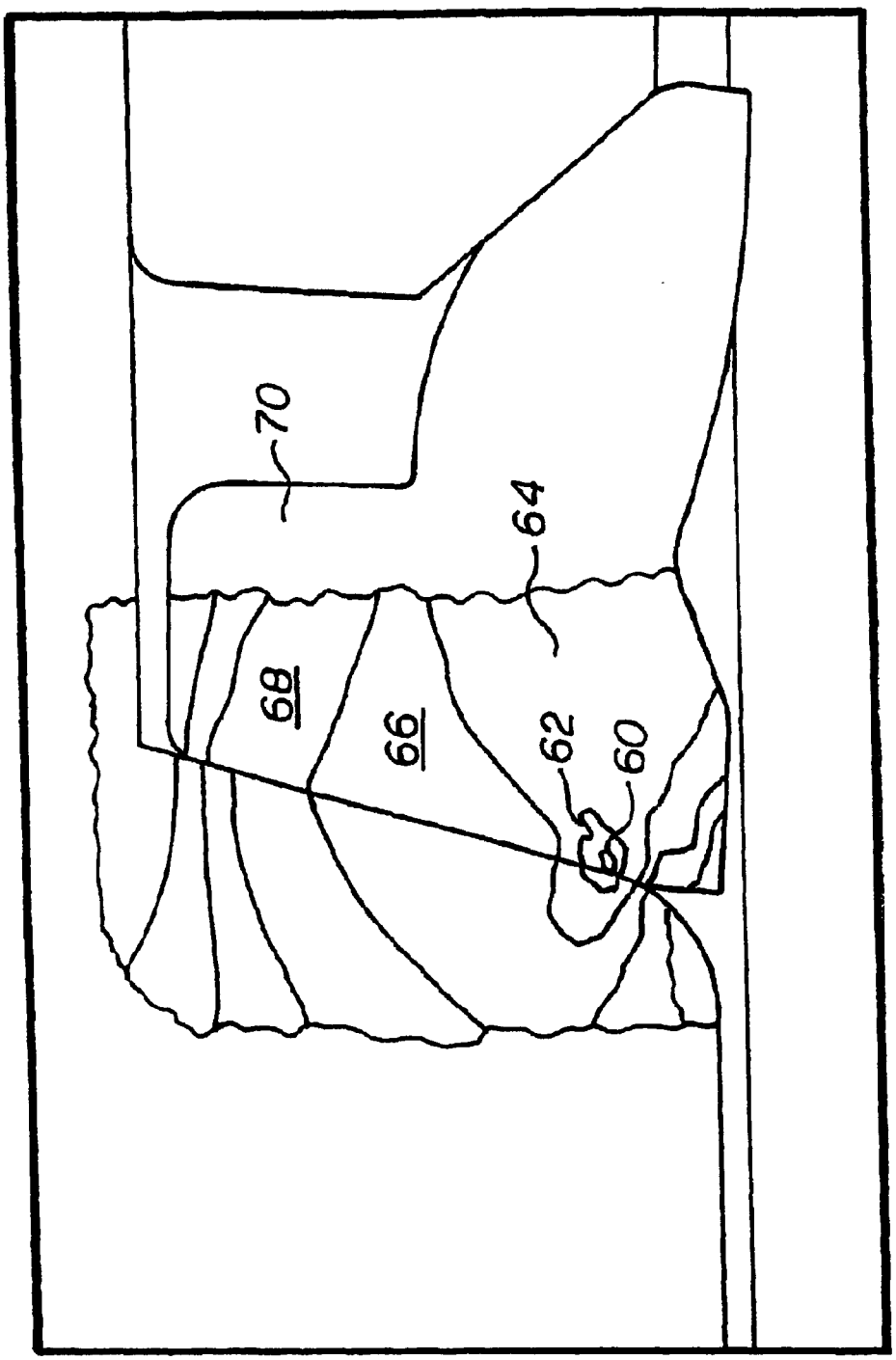
FIG. 9 is a view of the fitting of FIG. 8 in a made-up condition and illustrating the stress concentrations.

FIGS. 8 and 9 show another modified rear ferrule in accordance with the teachings of the present invention. This rear ferrule is the same as shown in FIG. 5. As particularly evident in FIG. 9, the region of high stress concentration is substantially reduced in size when compared to FIG. 7. This indicates that the stresses have been more uniformly dispersed over the rear face of the flange of the rear ferrule. Thus, the torque is reduced and the potential for galling is likewise reduced.

Figure 10:
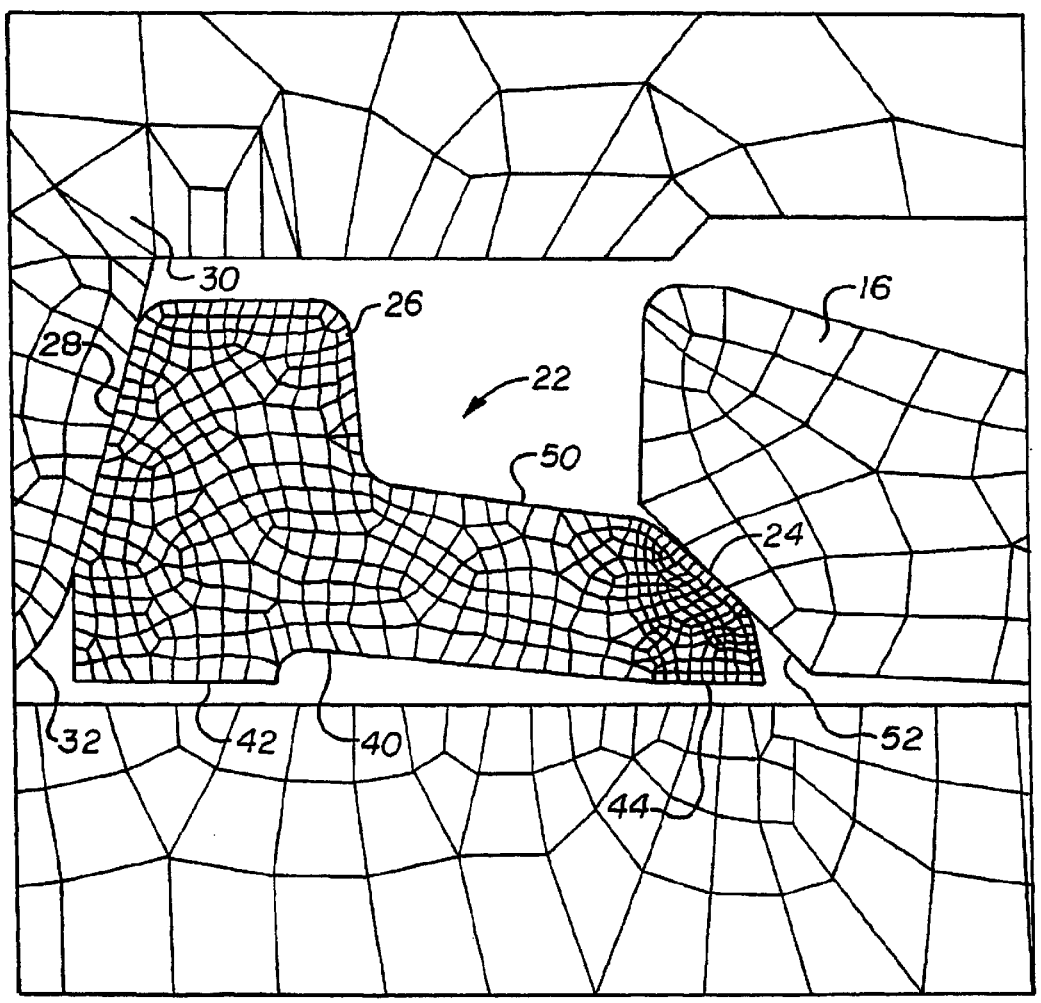
FIG. 10 is a cross-sectional view of a fitting at initial make-up including a rear ferrule modified in accordance with the teachings of the invention (graphically meshed for finite element analysis)
Figure 11:
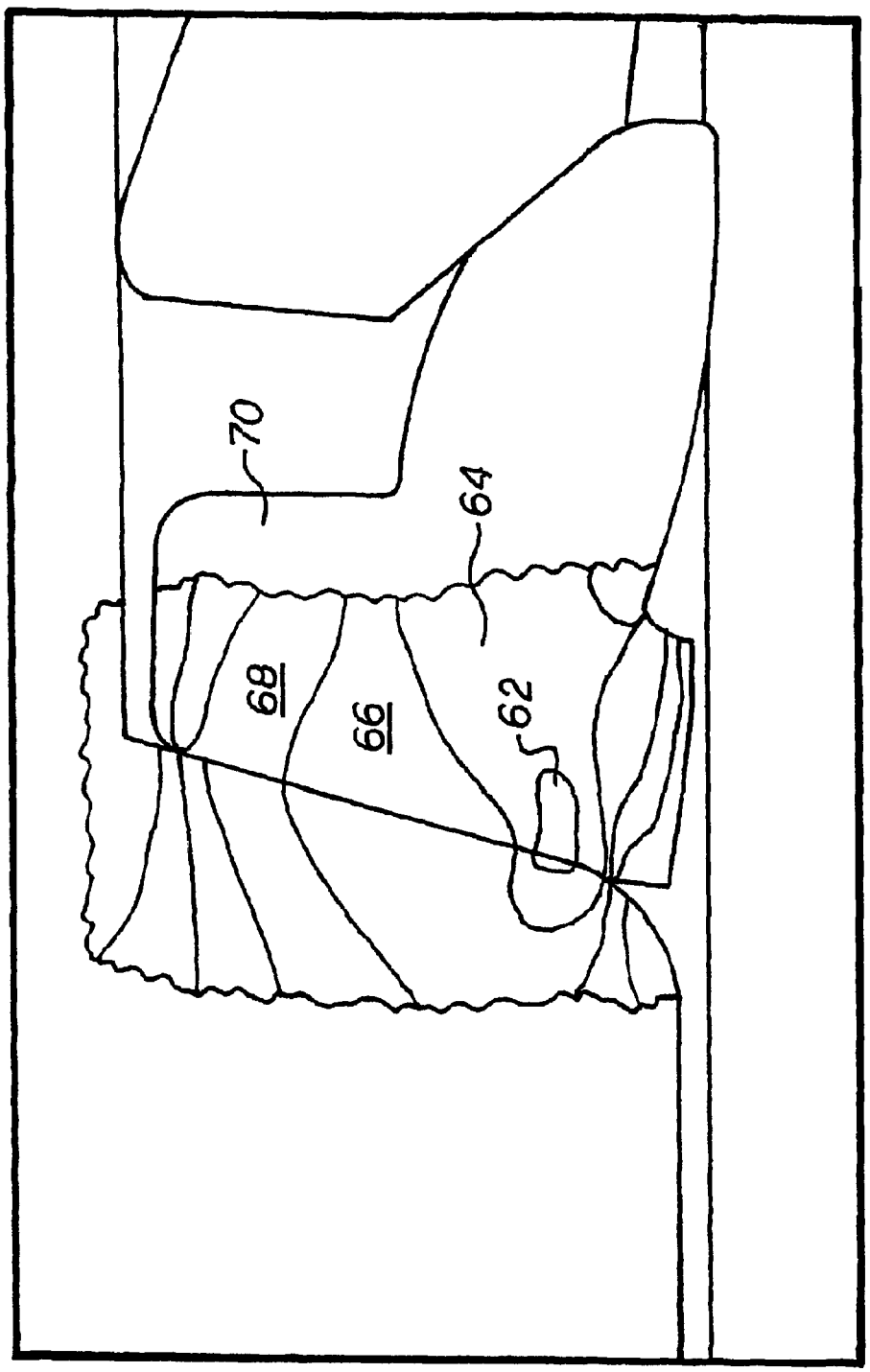
FIG. 11 is a view of the fitting of FIG. 10 in a made-up condition and illustrating the stress concentrations.

FIGS. 10 and 11 represent the rear ferrule shown and described in FIG. 4. Here, the finite element analysis illustrates that the region of high stress concentration is substantially removed at the rear face and a more uniform distribution of stresses obtained. Again, the torque forces associated with make-up are thus reduced with the corresponding reduction in localized stress concentrations. The recess and conical outer wall provide a radial component to the forces generated in the fitting and transferred through the rear ferrule while still providing a desired gripping and sealing of the tube.

Figure 12:
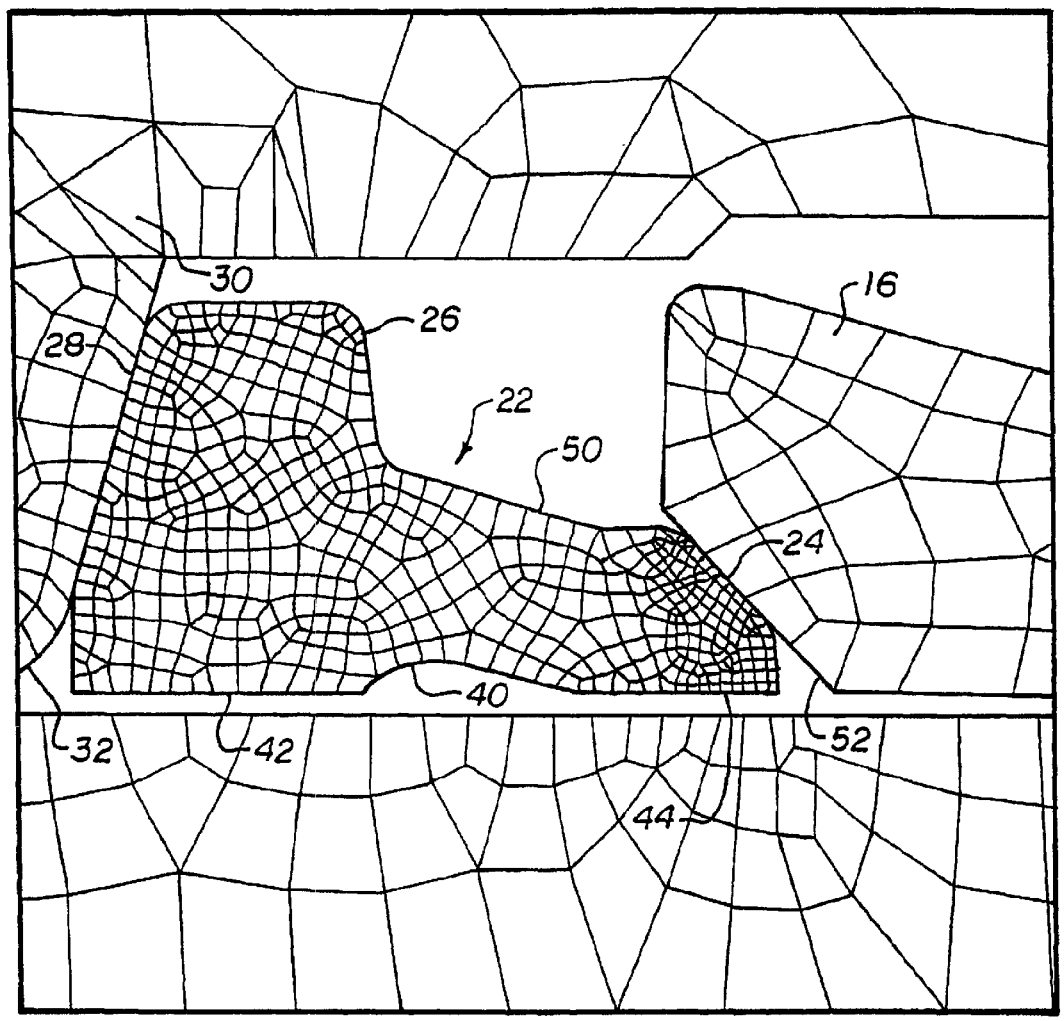
FIG. 12 is a cross-sectional view of a fitting at initial make-up including a rear ferrule modified in accordance with the teachings of the invention (graphically meshed for finite element analysis)
Figure 13:
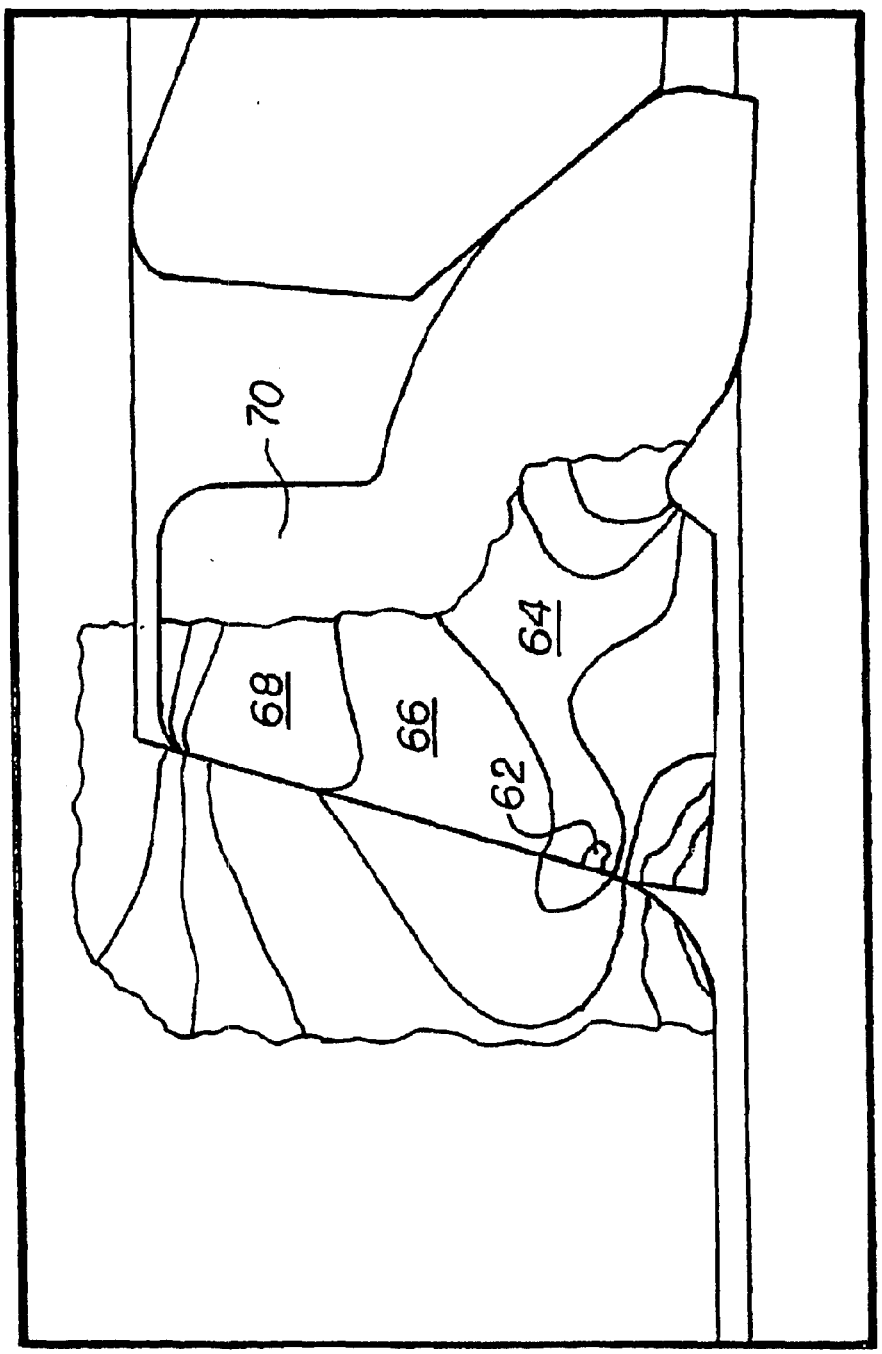
FIG. 13 is a view of the fitting of FIG. 12 in a made-up condition and illustrating the stress concentrations.

The embodiment of FIGS. 12 and 13 also achieves these same objectives. The recess is of a slightly different configuration, i.e., the recess is more sharply defined in the inner wall of the rear ferrule. It is also shifted slightly forwardly so that the deepest portion of the recess is located forwardly of the rear flange. However, the outer wall is still of conical configuration and in conjunction with the recess distributes the stresses along the rear face of the rear ferrule.

As is apparent with the various embodiments described above, the recess and the tapered outer wall do not require a particular conformation to achieve the stress distribution and reduced torque for make-up of the fitting. In fact, a number of proposed alternative embodiments are illustrated in table form in FIG. 14. For example, the first row of geometries have a standard location that is generally defined as the rear edge of the recess being located axially beneath the intersection of the outer wall and the enlarged flange. The tear drop, right triangle, rectangle, oval, square circular, obtuse triangle, curve, and compound curve are various shapes that the recess may adopt. Moreover, the recess can be positioned at a forward location (second row), or a rearward location where the deepest portion of the recess is positioned beneath the enlarged flange (third row) while still adopting the various configurations. Still further, the orientation of the shapes can be reversed as demonstrated by the various geometries in the fourth row or the sixth row, or the recess may be defined by multiple recesses as shown in the geometries of the fifth and eighth rows. Alternatively, the recess(es) may be enlarged as indicated in the seventh and eighth rows. Accordingly, the invention is not limited to the particular configurations shown and described in the earlier embodiments of FIGS. 2–13, but may also be incorporated into selected other geometrical configurations.

With reference to FIGS. 15–20, another embodiment of the invention is illustrated. As noted herein above, the use of a recess 40 in the rear ferrule 22 significantly reduces stress concentrations at the drive surface 32 of the drive nut 30 by adding a radial component to the pull up forces. The provision of the tapered outer wall 50 further can contribute to the radial component and stress distribution, as well as controlled deformation of the rear ferrule 22 during pull up. In accordance with the embodiments of FIGS. 15–20, the rear ferrule is provided with a contoured drive surface that further reduces stress concentrations in the area of engagement between the drive nut 30 and the rear ferrule 22.

Figure 21:
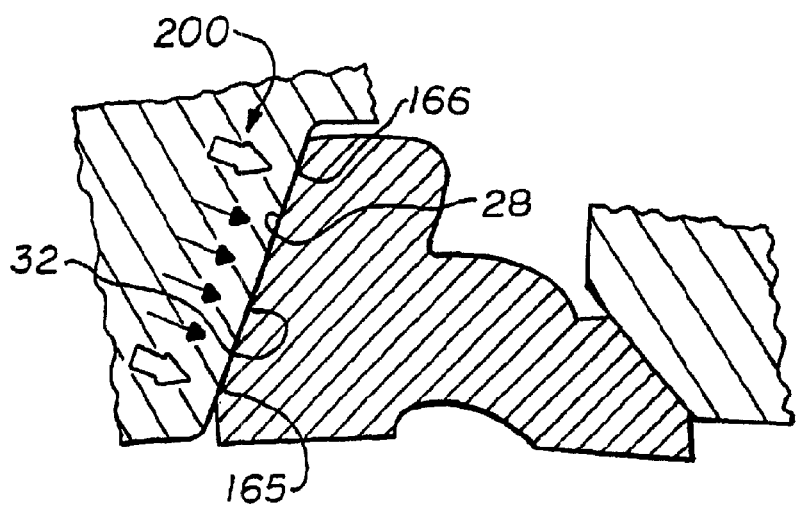
FIG. 21 illustrates stress distributions in a two ferrule fitting that does not use a contoured rear ferrule.

FIG. 21 illustrates in an exemplary manner typical pull up stress distributions at the dive nut drive surface 32 and the rear ferrule drive surface 28, typical in cases that incorporate a recess 40 type structure in the rear ferrule as described herein before. These stress concentrations are represented by the arrows 200. By comparing the stress distributions of FIG. 21 and the stress concentrations in FIG. 7 (FIG. 7 being illustrative of a rear ferrule that does not include a recess-type or notch structure 40) it is apparent that the provision of the recess 40 concept significantly and substantially reduces stress concentration on the drive nut drive surface 32 as noted hereinbefore. This reduction in stress concentrations is further evident from a comparison of FIG. 7 with FIGS. 9, 11 and 13.

Although FIG. 21 is not an FEA representation, it illustrates the point that the use of the recess 40 may not in all cases entirely eliminate stress concentrations at the rear surface of the rear ferrule (albeit the use of the recess or notch 40 greatly reduces stress concentrations in comparison to a rear ferrule that does not include a notch or recess). In the simplified representation of FIG. 21, stress concentrations may exist for example at the radially inner and outer portions of the rear ferrule flange 26 (referred to herein as bi-modal stress concentrations as they can occur though not have to occur as two regions of stress concentrations). These somewhat higher bi-modal stress concentrations are represented by the heavier arrows in FIG. 21. The present invention is thus directed to further reducing such stress concentrations, with the results illustrated in FIG. 19, wherein the arrows represent a substantial elimination of pull up force concentrations using a modified rear ferrule drive surface and the recessed inner radius.

In accordance with this further aspect of the invention a two ferrule fitting is shown having a rear ferrule which is modified so as to reduce further the pull up stress concentrations by substantially distributing the stress concentration along the rear surface that engages the drive surface 32 of the drive nut 30. As is shown in FIGS. 15–18, corresponding fitting components are shown in finger-tight position preparatory to final tightening.

Figure 15:
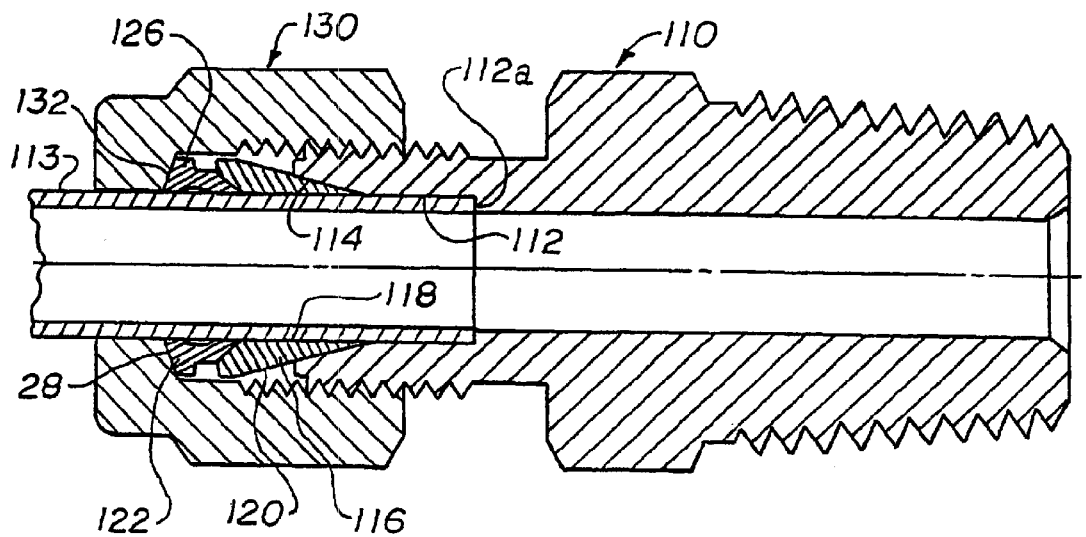
FIG. 15 is a cross-sectional view of an alternative embodiment of a two ferrule fitting.
Figure 16:
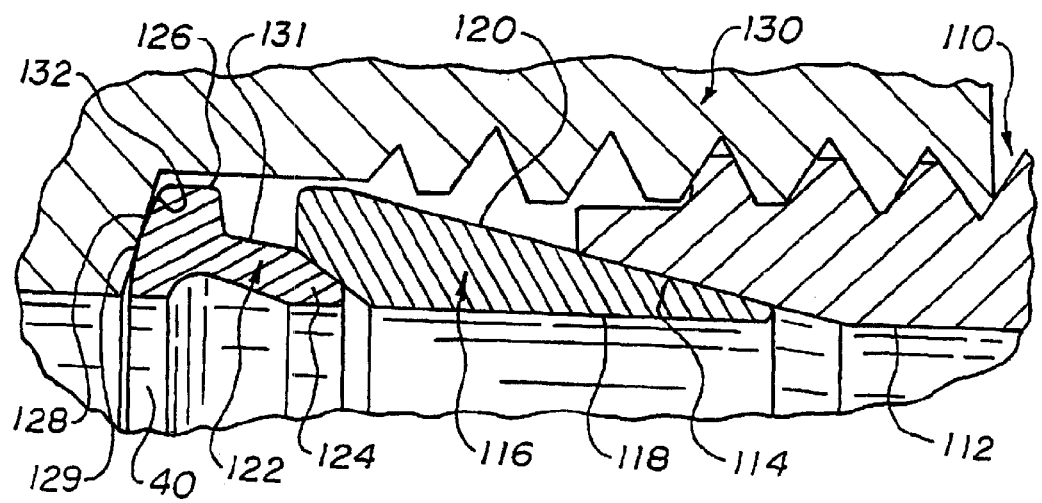
FIG. 16 is an enlarged view of the ferrule region of the embodiment of FIG. 15.

With specific reference to FIGS. 15 and 16, the fitting comprises a body 110 having a cylindrical opening 112 for receiving a tube end 113 that bottoms on a counterbore 112*a*. A tapered, frusto-conical cam mouth 114 is located at the axial rear or receiving end of the opening 112. A front ferrule 116 having a smooth, cylindrical, radially inner wall 118 is closely received on the tube 113. The front ferrule 116 has a tapered outer surface 120 which engages the tapered mouth 114 of the body 110.

Associated with the front ferrule 116 and located axially adjacent (i.e., in a rearward direction concentrically aligned with the longitudinal axis of the fitting) is a rear ferrule 122 configured with a tapered nose portion 124 having a rearward, tapered surface 127. The rear ferrule 122 also includes a radially extending rear flange 126 having a contoured end face 128. The contoured face 128 includes a rearward-facing driven surface 129 which is engaged by a respective driving surface 132 of the drive nut 130.

The tapered nose surface 127 of the rear ferrule 122 engages and may have, but not necessarily, substantially the same angle as a tapered cam surface 125 in the rear area of the front ferrule 116. The nose portion 124 is joined with the flange 126 by a preferably tapered outer wall 131. In the illustrated embodiment the wall 131 tapers with an increasing radial dimension in the axially rearward direction. The outer wall 131 could also be cylindrical, although it is preferred to be tapered to further facilitate reduction of stress concentrations on the rear surface 129.

The ferrules 116 and 122 are enclosed by a threaded drive nut member 130 which includes a drive surface 132 that engages the contoured face 129 of the rear ferrule 122. The nut member 130 threadably engages a threaded portion of the body 110. During tightening and make-up of the fitting, the drive surface 132 of the nut 130 applies pull up forces against the contoured face 129 of the rear ferrule 122 to drive both ferrules axially forward (to the right as viewed in FIG. 16) into the fully engaged position shown in FIG. 19. The rear ferrule is configured so that upon forced engagement with the tapered cam surface 125, the nose portion 124 deforms radially inward. This action is desirable since it results in a tight gripping engagement of the rear ferrule 122 inner cylindrical wall with the outer surface of the wall of the tubing 113.

Figure 18:
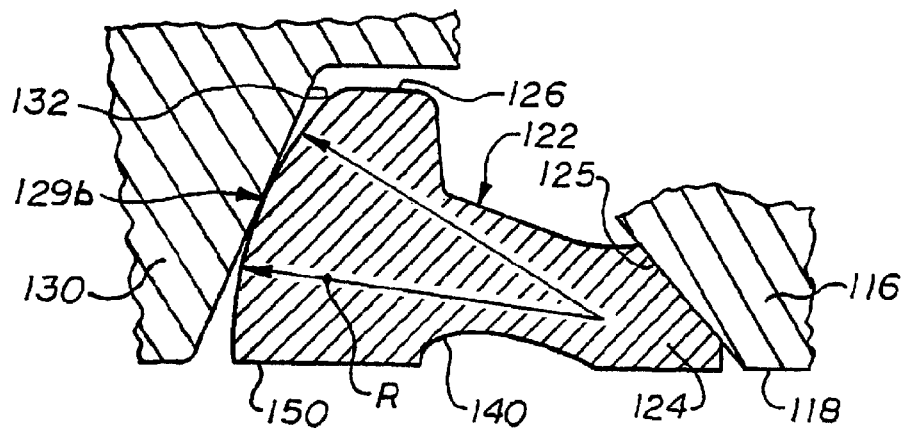
FIG. 18 is a partial view of a contoured rear ferrule shown in the engaged position with a front ferrule and drive nut surfaces prior to pull up.
Figure 19:
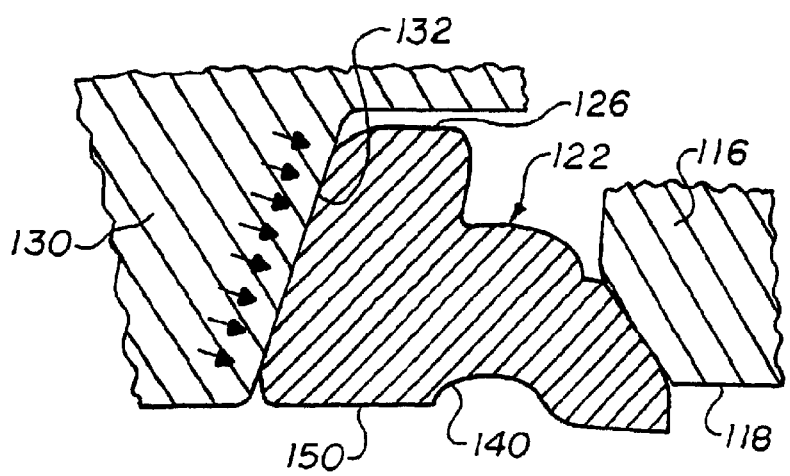
FIG. 19 is a view of the embodiment of FIG. 18 in the pulled up condition showing stress distributions.
Figure 20:
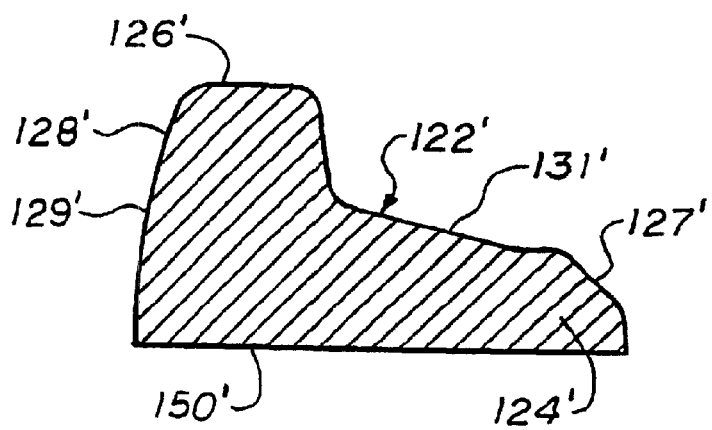
FIG. 20 is another embodiment of the invention.

In the embodiments illustrated in FIGS. 15–20, the contoured face 128 of the rear ferrule 122 may be rounded, curved, arcuate, or bowed or other curvilinear shape or combination of such shapes. Preferably but not necessarily the face 128 has a portion of which is a contour in the form of a convex radius R. The center of the radius can be, for example, internal to the ferrule body as shown in FIG. 18. However, those skilled in the art will readily appreciate that the origin of the radius surface 129 can be located anywhere with respect to the rear ferrule structure with the illustration of FIG. 18 being provided for illustrative purposes only. One aspect of the contoured face 128 is that with the driven surface 129 in the form of a convex radius, a line contact 129*b* (or reduced face to face radial contact) is formed initially with the nut drive surface 132, in a region between the inner and outer radial portions of the flange 126. The rear ferrule also preferably includes a recess 140 which can be of any configuration as previously described herein above. Alternatively, the contoured rear face 128 can be used with a rear ferrule configuration that omits the recess 140, as illustrated in FIG. 20.

Although the use of a radius or other curvilinear surface for the contoured surface 128 is desirable, there is a practical limit as to how small that radius can be made. If the radius of curvature is made too small then there will possibly be undesired stress concentrations develop in the center region of the contoured face 128.

A distinct advantage of the contoured rear ferrule 122 is that pull up stresses between the nut drive surface 132 and the contoured face 128 of the rear ferrule 122 are more uniformly distributed across the surface 128 of the rear ferrule, thus reducing and substantially eliminating stress concentrations. This further reduction of stress concentrations on the drive nut 130 reduces pull up torque and reduces galling, thus facilitating re-make of the fitting.

It is important to note that although the illustrated embodiments show an initial contact between the rear ferrule 122 and the drive nut 130 as generally in the middle of the contoured face 128, this is not required in every application. The initial point of contact will be a function of the overall fitting design, including the geometry of the tapered wall 131, the recess 140, the nose portion 127, the front ferrule 116 configuration and so forth. But in keeping with a general aspect of the invention, the contoured face 128 will be convex or axially variant in the region between the radial inner and outer portions of the flange 126 so as to distribute more uniformly the pull up forces acting on the drive nut 132 to reduce galling and pull up torque as compared to a conventional rear ferrule design that has a substantially flat non-contoured driven surface 128.

FIG. 20 illustrates an embodiment of the invention in which the rear ferrule 122' has a substantially cylindrical inner wall 150', but otherwise includes the flange 126' having a contoured driven surface 128' and a nose portion 124' with a front bevel 127 and a tapered outer wall 131'.

Figure 22:
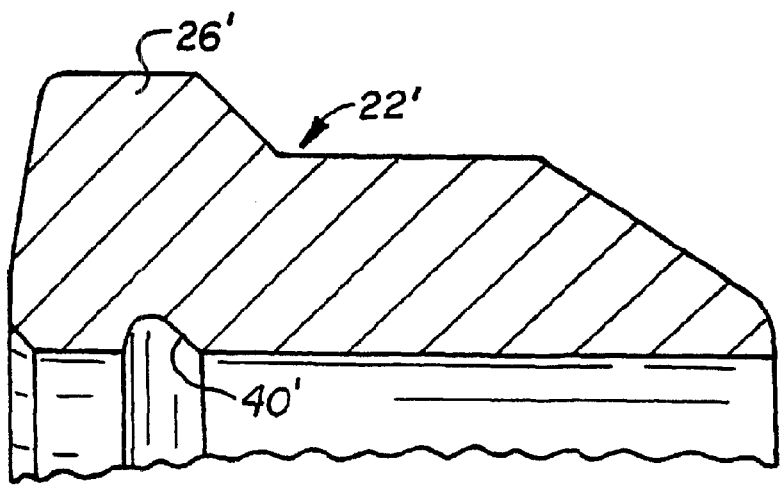
FIG. 22 illustrates another embodiment of a rear ferrule design incorporating a circumferential recess.

FIG. 22 illustrates another embodiment of the invention wherein the rear ferrule 22' design can have the recess 40' shifted axially rearward, generally within the axial dimension of the flange 26'.

Figure 23A:
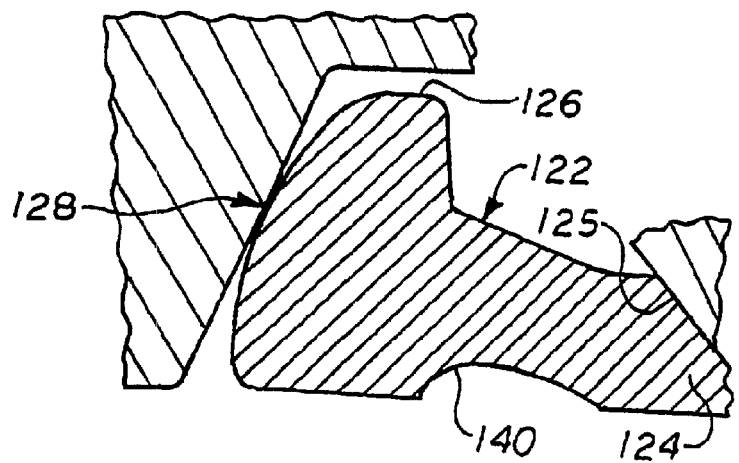
FIGS. 23A–F illustrate various alternative rear ferrule driven surface profiles.
Figure 23B:
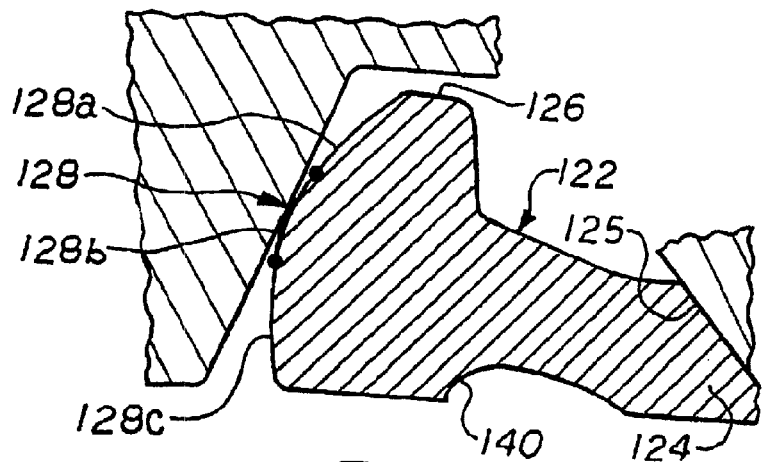
Figure 23C:
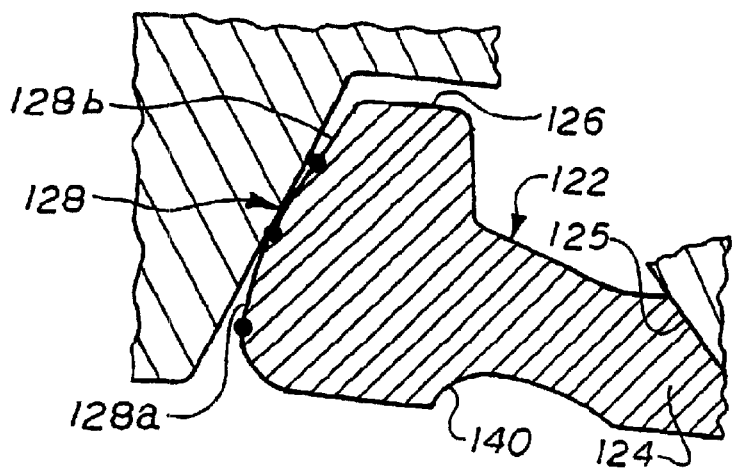
Figure 23D:
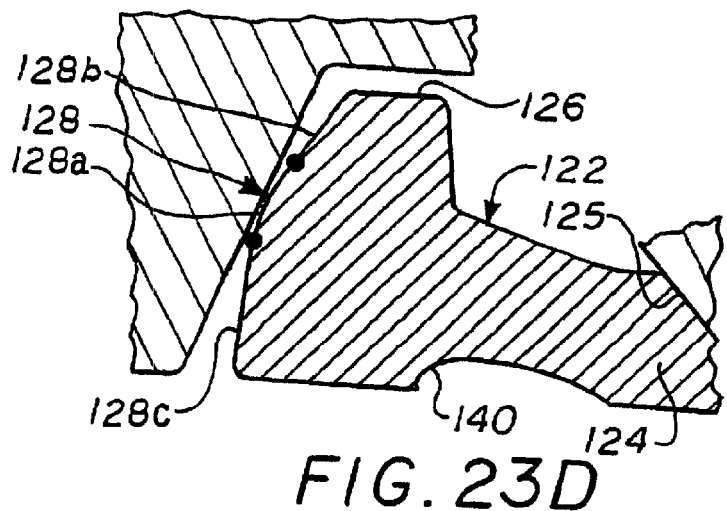
Figure 23E:
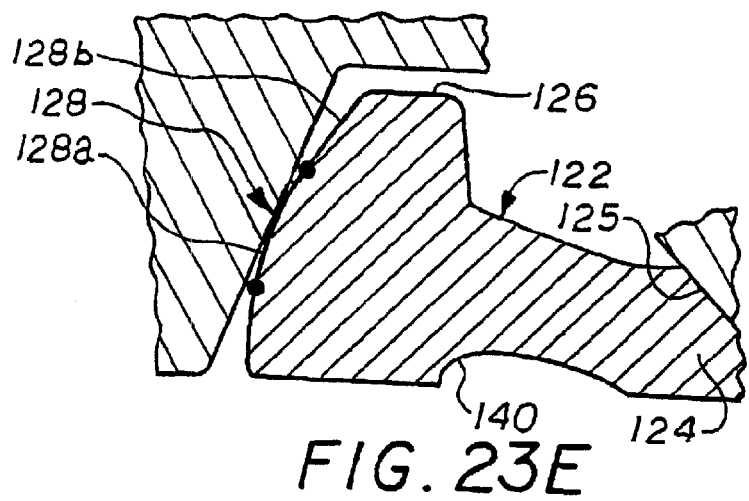
Figure 23F:
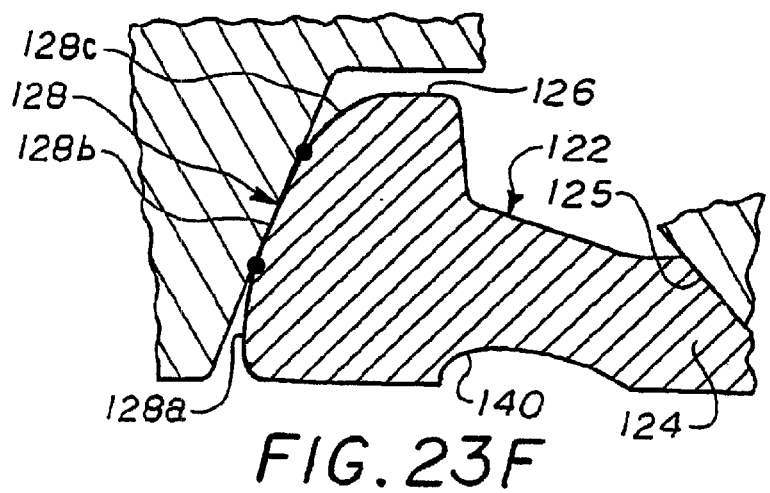

With reference to FIGS. 23A–F, we illustrate a number of variations of the contoured end face 128. In FIG. 23A the face 128 is formed with an elliptical profile. In FIG. 23B, the face 128 is formed by a blending of multiple radiuses such as sections 128*a*, 128*b* and 128*c* (dots on the drawing designate points of intersection of the arcs and not physical features of the end face). In FIG. 23C, the end face 128 includes a central portion 128a having a first radius profile, and outer portion 128b formed by a second radius profile. In FIG. 23D the end face 128 includes a central portion 128a having a profile formed by a radius and outer portions 128b and 128c formed as straight surfaces (in section the surface appears straight, though realized in the form of a conical surface). In FIG. 23E the end face 128 includes an elliptical portion 128a and a straight portion 128b. And in FIG. 23F the end face 128 has a profile formed by three geometric shapes of an ellipse 128a, a straight portion 128b and a radius portion 128c. In all the examples of FIG. 23A–F the point made is that the selected profile and geometry for the contoured end face 128, as with the earlier embodiments described hereinbefore, is designed to achieve the desired plastic deformation of the rear ferrule 122 hinge-like nose to achieve excellent gripping of the tube while also maintaining the proper sequential pull-up operation with the front ferrule.

Figure 24A:
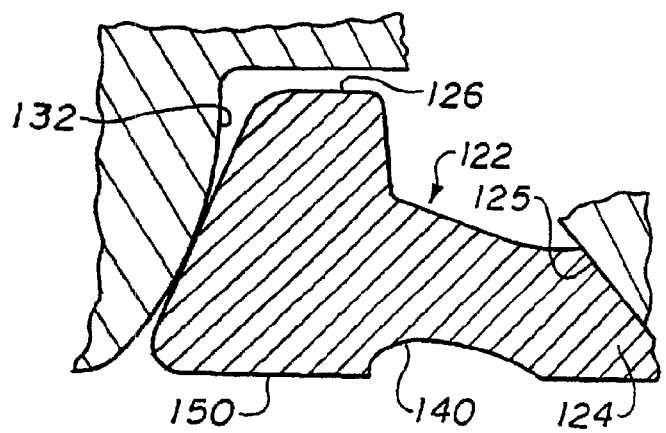
FIGS. 24A–G illustrates an alternative embodiment of the invention wherein the drive surface of the nut is provided with a contour surface.
Figure 24B:
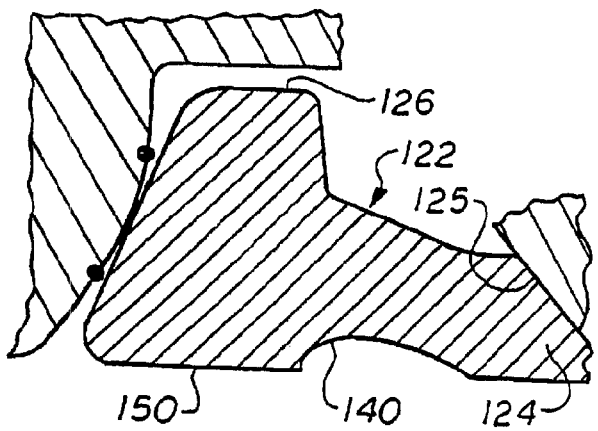
Figure 24C:
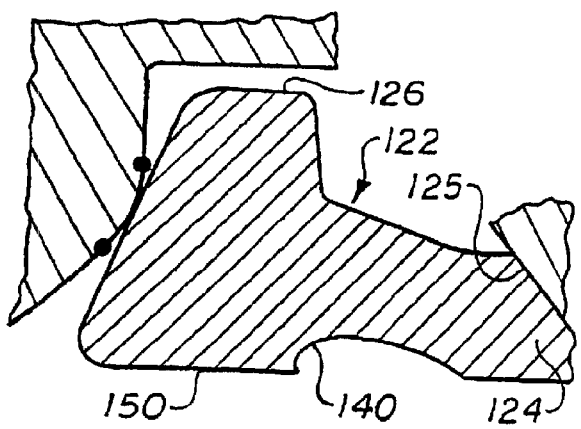
Figure 24D:
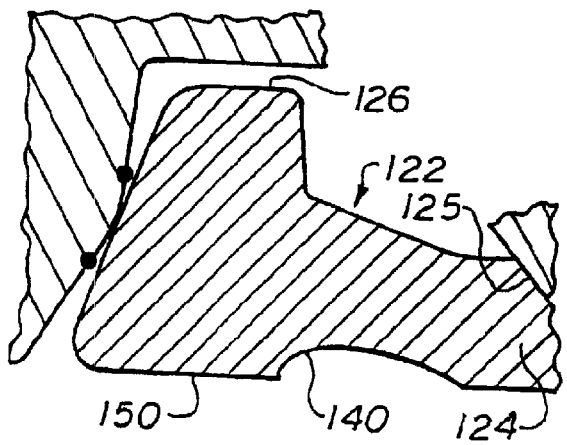
Figure 24E:
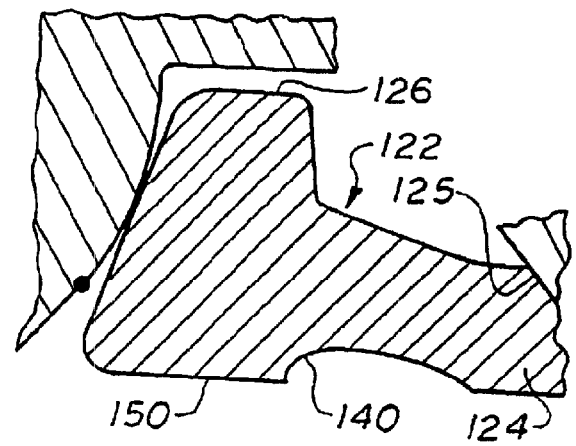
Figure 24F:
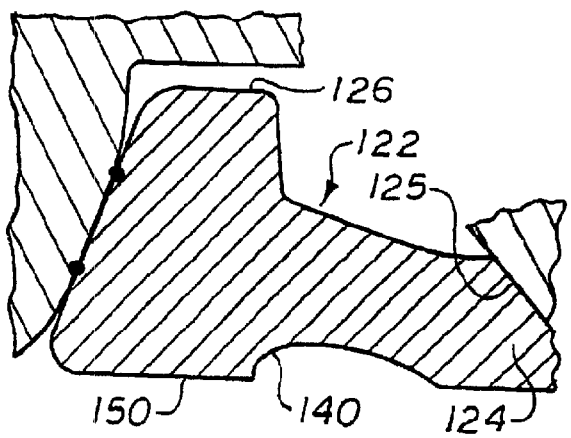
Figure 24G:
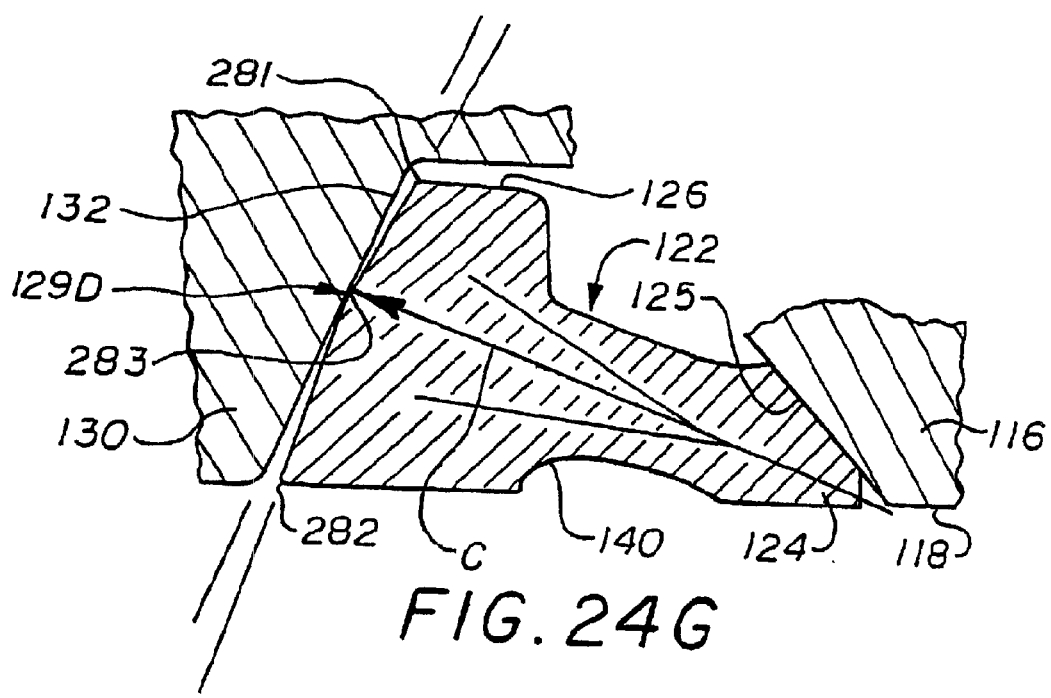

With reference to FIGS. 24A–F, the present invention can also be realized by incorporating a contoured profile in the drive surface 132 of the nut 130. In these embodiments, the rear driven surface 128 is conical. Alternatively, both the drive surface 132 and the driven surface 128 could be contoured. FIGS. 24A–F correspond to FIGS. 23A–F as to the contour shape applied to the drive nut surface 132. Thus, FIG. 24A illustrates an elliptical profile; FIG. 24B illustrates a multiple circle profile; FIG. 24C illustrates a two radius surfaces; FIG. 24D illustrates a radius surface and two straight portions; FIG. 24E illustrates an ellipse contour with a straight portion; and FIG. 24F illustrates a combination of a radius, straight and ellipse portions. In yet another embodiment of FIG. 24G, the nut drive surface 132 can be formed of two straight portions that join at an apex 129D.

Figure 25:
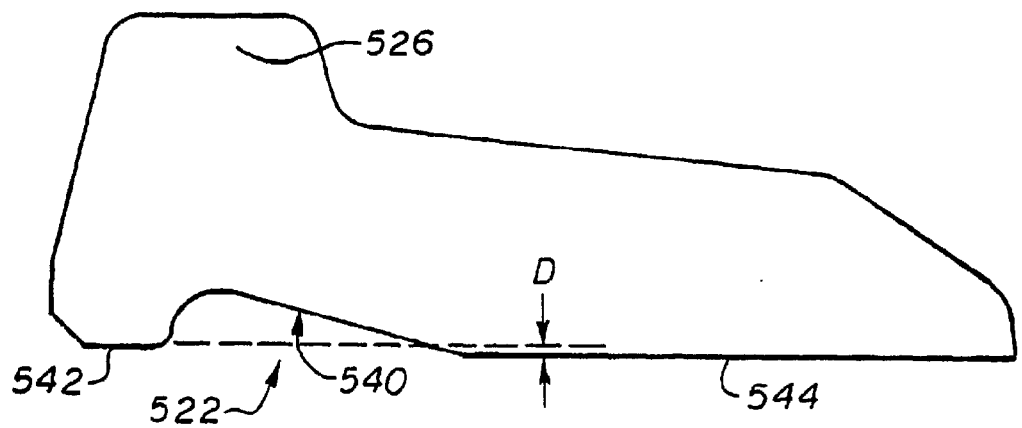
FIG. 25 illustrates another alternative embodiment of a ferrule having an inner cylindrical bore formed of two different diameters.

With reference to FIG. 25, in still a further embodiment, the rear ferrule 522 include a recess 540 in the inner cylindrical wall. However, in this embodiment, the rear flat portion 542 is formed by a larger diameter bore in the ferrule 522 body as compared to the diameter of the bore that forms the forward flat 544. By forming the rear surface 542 with a larger diameter, a single tool can be used to form the notch 540 and the central bores through the ferrule 522 body. The difference in the two diameters is represented by the dimension D in FIG. 25. Note that the notch or recess 540 is positioned in the rearward portion of the ferrule 522 body. This provides an axially elongated forward surface 544 that assists in maintaining the ferrule in alignment during assembly since the rear portion 542 does not as closely surround the tube. Those skilled in the art will readily appreciate, however, that the enlarged diameter rear portion 542 can be used with many of the notch 40 profiles illustrated herein and others, including multiple notch designs. The rear ferrule 522 may also include a contoured rear wall as in the embodiments described herein.

Figure 26:
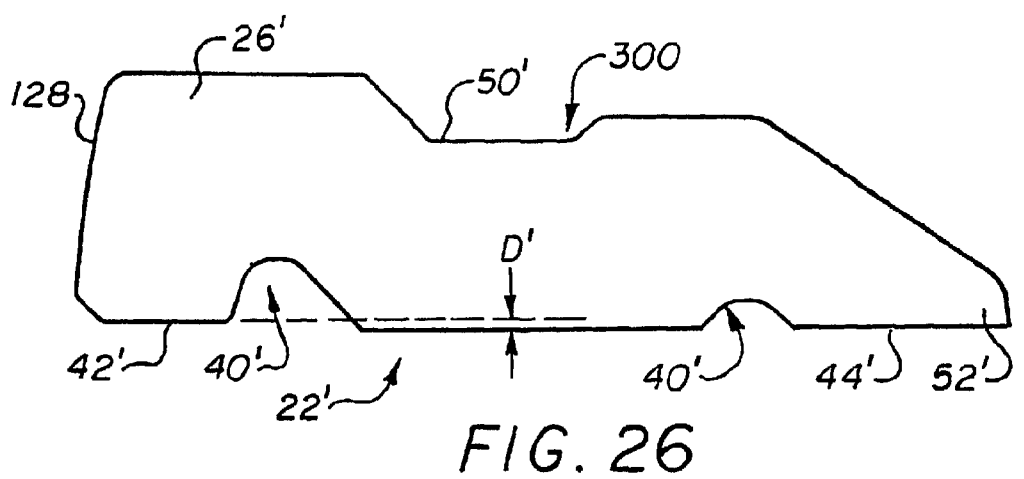
FIG. 26 illustrates another alternative embodiment of a ferrule having an outer notch or recess in the ferrule body.
Figure 27:
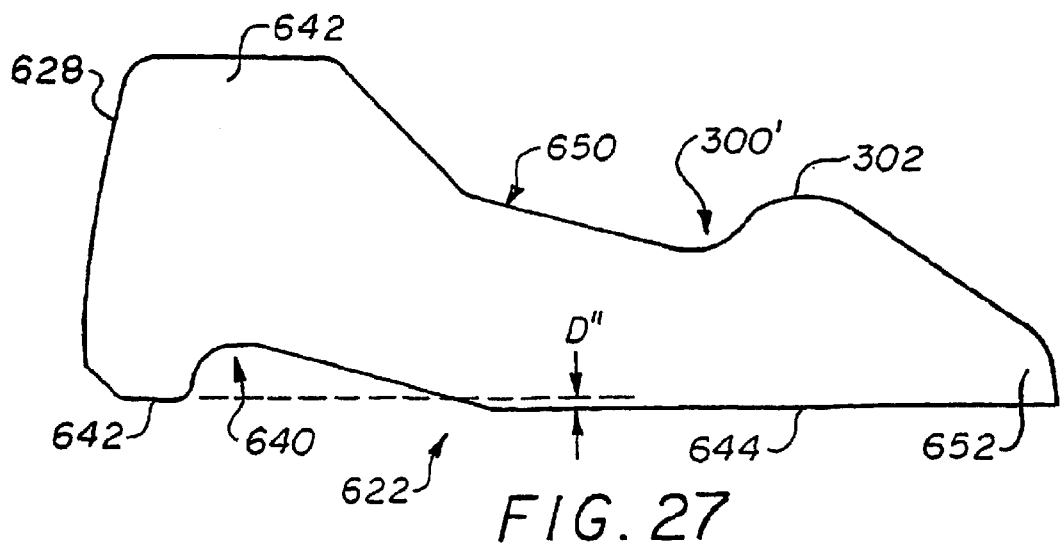
FIG. 27 illustrates another alternative embodiment of the invention of a ferrule having a notched inner bore, a contoured rear surface, an outer notch and a crown portion on the ferrule nose region.

FIG. 26 illustrates another embodiment of the rear ferrule 22'. In this embodiment, in addition to the double notches 40' in the central through bore, the ferrule includes a notch or recess 300 in the outer diameter surface 50' of the ferrule. This notch 300 can be used as part of the "hinge" design to further control the plastic deformation of the ferrule nose portion 52' during pull-up. FIG. 27 illustrates a further example of a rear ferrule 622 that incorporates the central recess 640, a tapered outer diameter 650 having an outer diameter recess or notch 300', and the larger diameter rear portion or radial flange 642 with a contoured or radius driven surface 628. The rear surface 642 is of a slightly larger diameter than the forward surface 644, as in other examples herein, as represented by the dimension D". All of the actual dimensions and profiles may be selected to cause the ferrule 622 to plastically deform with desired loads against the tube surface and minimized load concentrations against the nut drive surface and also assure proper driving force into the front ferrule. As with the various other rear ferrule designs illustrated herein, the various concepts of the rear ferrule design can be used in a single ferrule fitting.

The ferrule illustrated in FIG. 27 includes the outer notch 300'. The FEA illustration of FIG. 28 dramatically shows how this outer notch 300' produces a significant hinge effect at the nose portion 652 of the rear ferrule. The outer notch 300 is bounded by a radially extending crown 302. This crown 302 functions to prevent the nose of the rear ferrule 22' from slipping (as, for example, in a telescoping manner) under the front ferrule when the tubing is thin walled or otherwise easily deformed during make-up of the fitting. Without the crown 302, as the thin tube wall collapsed the nose of the rear ferrule could be forced out of the camming mouth of the front ferrule and slip under the front ferrule, preventing proper sequential pull-up and poor gripping by either ferrule. Preferably, the crown 302 maintains contact with the inner camming mouth of the front ferrule during pull-up.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A tube fitting comprising: a fitting body having a cylindrical bore for receiving a tube end and including a tapered mouth at one end of said bore; a drive member having a threaded engagement with said body and having a ferrule drive surface; a first ferrule having a tapered first end that extends into said tapered mouth of the fitting body and having a second end with a tapered recess forming a camming surface that axially extends toward said first end; and a second ferrule having a generally cylindrical interior wall, a tapered first end that extends into said tapered recess and engages said camming surface of said first ferrule, a tapered outer wall portion, and a driven surface on a second end thereof that engages said drive member ferrule drive surface; said second ferrule interior wall having a first circumferential recess located between said first and second ends of said second ferrule; said tapered wall portion having a second circumferential recess near said first end; wherein said second ferrule driven surface comprises a contoured face and that with said first and second circumferential recesses produce a radial component in pull up forces occurring at said drive surface to distribute more uniformly said pull up forces across an interface area between said drive surface and said contoured face as compared to force concentration areas that would otherwise be present at said interface area in absence of said contoured face and said first and second circumferential recess.

2. The fitting of claim 1 wherein said drive member axially drives said second ferrule into said first ferrule tapered recess and axially drives said first ferrule into said body tapered mouth when said drive member is pulled up with said body.

3. The fitting of claim 1 wherein said second ferrule second circumferential recess has an increasing radial depth in the axial direction toward said second ferrule second end.

4. The fitting of claim 1 wherein said second ferrule tapered outer wall includes a radially extending crown adjacent said first end.

5. The fitting of claim 4 wherein said crown remains in contact with said first ferrule tapered recess during pull-up of the fitting.

6. The ferrule of claim 1 wherein said second ferrule is case hardened over a portion of its surface.

7. The ferrule of claim 1 wherein said second ferrule is case hardened over its entire surface.

8. A tube fitting comprising: a fitting body having a cylindrical bore for receiving a tube end and including a tapered mouth at one end of said bore; a drive member having a threaded engagement with said body and having a ferrule drive surface; a first ferrule having a tapered first end that extends into said tapered mouth of the fitting body and having a second end with a tapered recess that axially extends toward said first end; and a second ferrule having a generally cylindrical interior wall, a tapered first end that extends into said tapered recess of said first ferrule, and a driven surface on a second end thereof that engages said drive member ferrule drive surface; said second ferrule interior wall having a first circumferential recess located between said first and second ends of said second ferrule; said nut drive surface being contoured; said contoured drive surface and said recess reducing force concentrations on said drive member drive surface when the fitting is pulled up; wherein said drive surface comprises a radius portion.

9. A tube fitting comprising: a fitting body having a cylindrical bore for receiving a tube end and including a tapered mouth at one end of said bore; a drive member having a threaded engagement with said body and having a ferrule drive surface; a first ferrule having a tapered first end that extends into said tapered mouth of the fitting body and having a second end with a tapered recess that axially extends toward said first end; and a second ferrule having a generally cylindrical interior wall, a tapered first end that extends into said tapered recess of said first ferrule, and a driven surface on a second end thereof that engages said drive member ferrule drive surface; said second ferrule interior wall having a first circumferential recess located between said first and second ends of said second ferrule; said nut drive surface being contoured; said contoured drive surface and said recess reducing force concentrations on said drive member drive surface when the fitting is pulled up; wherein said drive surface comprises a curvilinear portion.

10. A tube fitting comprising: a fitting body having a cylindrical bore for receiving a tube end and including a tapered mouth at one end of said bore; a drive member having a threaded engagement with said body and having a ferrule drive surface; a first ferrule having a tapered first end that extends into said tapered mouth of the fitting body and having a second end with a tapered recess that axially extends toward said first end; and a second ferrule having a generally cylindrical interior wall, a tapered first end that extends into said tapered recess of said first ferrule, and a driven surface on a second end thereof that engages said drive member ferrule drive surface; said second ferrule interior wall having a first circumferential recess located between said first and second ends of said second ferrule; said nut drive surface being contoured; said contoured drive surface and said recess reducing force concentrations on said drive member drive surface when the fitting is pulled up; wherein said drive surface comprises at least two non-parallel straight portions.

* * * * *

UNITED STATES PATENT AND TRADEMARK OFFICE
CERTIFICATE OF CORRECTION

PATENT NO. : 6,629,708 B2
DATED : October 7, 2003
INVENTOR(S) : Peter C. Williams et al.

It is certified that error appears in the above-identified patent and that said Letters Patent is hereby corrected as shown below:

Column 2,
Line 29, please delete "comer" and insert -- corner --.

Signed and Sealed this

Twentieth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,629,708 B2
DATED : October 7, 2003
INVENTOR(S) : Williams et al.

It is certified that error appears in the above-identified patent and that said Letters Patent is hereby corrected as shown below:

Column 13,
Lines 4 and 6, delete "ferrule", first instance, and insert -- fitting --.
Line 22, delete "nut".

Column 14,
Lines 8 and 26, delete "nut".

Signed and Sealed this

Twenty-seventh Day of December, 2005

JON W. DUDAS
*Director of the United States Patent and Trademark Office*